US005454085A

United States Patent [19]
Gajjar et al.

[11] Patent Number: 5,454,085
[45] Date of Patent: Sep. 26, 1995

[54] METHOD AND APPARATUS FOR AN ENHANCED COMPUTER SYSTEM INTERFACE

[75] Inventors: Kumar Gajjar, San Jose; Kaushik S. Shah, Santa Clara; Duc H. Trang, San Jose, all of Calif.

[73] Assignee: MTI Technology Corporation, Sunnyvale, Calif.

[21] Appl. No.: 394,055

[22] Filed: Feb. 24, 1995

Related U.S. Application Data

[63] Continuation of Ser. No. 32,352, Mar. 12, 1993, abandoned, which is a continuation of Ser. No. 825,288, Jan. 22, 1992, Pat. No. 5,233,692, which is a continuation of Ser. No. 505,780, Apr. 6, 1990, abandoned.

[51] Int. Cl.$^6$ .............................. G06F 13/00; G06F 13/38
[52] U.S. Cl. ................... 395/285; 364/238.3; 364/238.4; 364/240; 364/240.2; 364/240.5; 364/260; 364/260.1; 364/284; 364/DIG. 1; 370/85.1; 395/309; 395/307; 395/441; 395/894; 395/884
[58] Field of Search ....................... 395/325, 250, 395/275, 200; 370/85.1; 340/825.14

[56] References Cited

U.S. PATENT DOCUMENTS

| | | | |
|---|---|---|---|
| 3,303,482 | 2/1967 | Jenkins | 340/174.1 |
| 3,544,777 | 12/1970 | Winkler | 235/153 |
| 3,693,159 | 9/1972 | Hilberg | 340/172.5 |
| 3,772,652 | 11/1973 | Hilberg | 340/172.5 |
| 3,803,560 | 4/1974 | DeVoy et al. | 340/172.5 |
| 3,905,023 | 9/1975 | Perpiglia | 340/172.5 |
| 3,917,933 | 11/1975 | Scheuneman et al. | 235/153 |
| 4,093,985 | 6/1978 | Das | 364/200 |
| 4,309,754 | 1/1982 | Dinwiddie, Jr. | 364/200 |
| 4,339,795 | 7/1982 | Brereton et al. | 364/200 |
| 4,339,804 | 7/1982 | Davison et al. | 364/200 |
| 4,371,932 | 2/1983 | Dinwiddie, Jr. et al. | 364/200 |
| 4,464,747 | 8/1984 | Groudan et al. | 371/50 |
| 4,467,421 | 8/1984 | White | 364/200 |
| 4,468,731 | 8/1984 | Johnson et al. | 364/200 |
| 4,471,425 | 9/1984 | Yamaguchi et al. | 364/200 |
| 4,507,730 | 3/1985 | Johnson et al. | 364/200 |
| 4,509,113 | 4/1985 | Heath | 364/200 |
| 4,541,048 | 9/1985 | Propster et al. | 364/200 |

(List continued on next page.)

FOREIGN PATENT DOCUMENTS

| | | | |
|---|---|---|---|
| 0369707 | 5/1990 | European Pat. Off. | G06F/3/06 |
| 56-94593 | 7/1981 | Japan | G11C/29/00 |
| 56-169297 | 12/1981 | Japan | G11C/29/00 |
| 56-163596 | 12/1981 | Japan | G11C/29/00 |
| 57-111890 | 7/1982 | Japan | G11C/29/00 |
| 57-111893 | 7/1982 | Japan | G11C/29/00 |
| 57-195397 | 12/1982 | Japan | G11C/29/00 |
| 58-83400 | 5/1983 | Japan | G11C/29/00 |
| 60-156152 | 8/1985 | Japan | G06F/12/16 |
| 61-99999 | 5/1986 | Japan | G11C/29/00 |

OTHER PUBLICATIONS

American National Standard for Information Systems (ANSI) Small Computer System Interface-2 (SCSI-2), Rev. 10, ANSI document number X3.131–198X, Jun. 23, 1989.
Andres et al., "Card-to-Card Communication," IBM Technical Disclosure Bulletin, vol. 25, No. 10, Mar. 1983, pp. 5236–5239.
G. Humphrey, "SCSI-Small Computer System Interface," Electronics & Wireless World, vol. 95, No. 1643, Sep. 1989, pp. 884–888.

(List continued on next page.)

*Primary Examiner*—Gopal C. Ray
*Attorney, Agent, or Firm*—Townsend and Townsend and Crew

[57] ABSTRACT

An improved interface system based in part on the SCSI standard is provided. A single cable data bus simultaneously transfers several bytes of information between two devices. The interface system transfers multiple-byte commands, messages, status information or data in a single parallel transfer. A microsequencer is provided to permit data transfers across the interface without requiring burdensome attention from a processor in a device involved in the transfer.

24 Claims, 9 Drawing Sheets

U.S. PATENT DOCUMENTS

| | | | |
|---|---|---|---|
| 4,570,220 | 2/1986 | Tetrick et al. | 364/200 |
| 4,635,191 | 1/1987 | Boning | 364/200 |
| 4,641,237 | 2/1987 | Yabushita et al. | 364/200 |
| 4,667,326 | 5/1987 | Young et al. | 371/40 |
| 4,722,085 | 1/1988 | Flora et al. | 371/38 |
| 4,761,785 | 8/1988 | Clark et al. | 371/51 |
| 4,763,249 | 8/1988 | Bomba et al. | 364/200 |
| 4,803,622 | 2/1989 | Bain, Jr. et al. | 364/200 |
| 4,817,035 | 3/1989 | Timsit | 364/900 |
| 4,825,403 | 4/1989 | Gershenson et al. | 364/900 |
| 4,827,409 | 5/1989 | Dickson | 364/200 |
| 4,849,929 | 7/1989 | Timsit | 364/900 |
| 4,868,742 | 9/1989 | Gant et al. | 364/200 |
| 4,870,704 | 9/1989 | Matelan et al. | 364/200 |
| 4,914,656 | 4/1990 | Dunphy, Jr. et al. | 371/10.2 |
| 4,965,801 | 10/1990 | DuLac | 371/40.1 |
| 5,081,701 | 1/1992 | Silver | 395/325 |
| 5,097,437 | 3/1992 | Larson | 395/775 |
| 5,113,369 | 5/1992 | Kinoshita | 395/325 |
| 5,204,951 | 4/1993 | Keener et al. | 395/325 |

OTHER PUBLICATIONS

W. Jilke, "Disk Array Mass Storage Systems: The New Opportunity," Amperif Corporation, Sep. 30, 1986, pp. 1–11.

W. Jilke, "Economics Study of Disk Array Mass Storage Systems: The Cost Reduction Opportunity," Amperif Corporation, Mar. 24, 1987, pp. 1–13.

D. Karr, "Designing to Full SCSI Implementation for Performance Improvement," 8080 Wescon Proceedings, San Francisco, California, Nov. 19–22, 1985.

M. Kim, "Synchronized Disk Interleaving," IEEE Transactions on Computers, vol. C–35, No. 11, Nov. 1986, pp. 978–988.

D. Lieberman, "SCSI–2 Controller Board Builds Parallel Disk Drive Arrays," Computer Design, vol. 28, No. 7, Apr. 1, 1989, pp. 32, 36.

W. Meador, "Disk Array Systems," Spring Compcon89 Digest of Papers, IEEE Computer Society Press, Feb. 27–Mar. 3, 1989, pp. 143–146.

T. Olsen, "Disk Array Performance in a Random IO Environment," Computer Architecture News, vol. 17, No. 5, Sep. 1989, pp. 71–77.

D. Patterson et al., "A Case for Redundant Arrays of Inexpensive Disks (RAID)," Report No. UCB/CSD 87/391, Dec. 1987, pp. 1–24.

D. Patterson et al., "A Case for Redundant Arrays of Inexpensive Disks (RAID)," ACM SIGMOD Conference, Chicago, Illinois, Jun. 1–3, 1988, pp. 109–116.

Product Description Micropolis 1804 SCSI Parallel Drive Array, Document No. 108120 Rev A, 1987.

Program Summary, DataStorage86, An International Forum, Sep. 22–24, 1986, Red Lion Inn, San Jose, California.

H. Sierra, "Assessing the Promise of Disk Arrays," Canadian Datasystems, May 1989, pp. 52–53.

D. Simpson, "RAIDs vs. SLEDs," Systems Integration, Nov. 1989, pp. 70–82.

J. Voelcker, "Winchester Disks Reach for a Gigabyte," IEEE Spectrum, Feb. 1987, pp. 64–67.

CABLE "A"

CABLE "B"

SCSI-2E

PROPOSED SCSI-2E MESSAGE CODES

| MESSAGE WORDS<br>00 01 02 03 | | | | DESCRIPTION | DIRECTION WITH<br>RESPECT TO INITIATOR | |
|---|---|---|---|---|---|---|
| 00 | | | | COMMAND COMPLETE | IN | |
| 01 | | | | SELECT WITH DISCONNECT | | OUT |
| 02 | | | | DISCONNECT WITH INITIATOR WAITING | IN | |
| 03 | | | | DISCONNECT | | OUT |
| 04 | | | | DISCONNECT WITH INTERRUPT PENDING | IN | |
| 05 | | | | ABORT ALL | | OUT |
| 12 | TS | | | STATUS TRANSFER SIZE | IN | |
| 1F | TS | | | UNSOLICITED INTERRUPT | IN | |
| 20 | SB | TS | | CONTINUE DATA TRANSFER | IN | |
| 21 | SB | TS | | CONTINUE DATA TRANSFER | | OUT |
| 30 | ID | SB | TS | RESELECTED FOR DATA | IN | |
| 32 | ID | SB | TS | RESELECTED FOR STATUS | IN | |
| 33 | ID | SB | TS | RECONNECT(ED) | | OUT |
| 35 | EC | SB | TS | INITIATOR DETECTED ERROR | | OUT |

500 → rows 00–05
502 → rows 12, 1F
504 → rows 20, 21
506 → rows 30, 32, 33, 35

WHERE

ID IS COMMAND REFERENCE NUMBER

SB IS STARTING BLOCK NUMBER (ONLY FOR READ DATA OPERATIONS)

TS IS TRANSFER SIZE

EC IS THE ERROR CODE

NOTE: THE UPPER THREE BYTES OF 1ST MESSAGE CODE ARE DON'T CARE
(I.E. XX XX XX MC)

FIG. 5.

METHOD AND APPARATUS FOR AN ENHANCED COMPUTER SYSTEM INTERFACE

This is a Continuation of application Ser. No. 08/032,352, filed Mar. 12, 1993, now abandoned, which is a continuation of application Ser. No. 07/825,288, filed Jan. 22, 1992, now U.S. Pat. No. 5,233,692 entitled INTERFACE PERMITTING MULTIPLE-BYTE PARALLEL TRANSFERS OF CONTROL INFORMATION AND DATA ON A SMALL COMPUTER SYSTEM INTERFACE (SCSI) COMMUNICATION BUS AND A MASS STORAGE SYSTEM INCORPORATING THE ENHANCED INTERFACE, which is a continuation of application Ser. No. 07/505,780, filed Apr. 6, 1990, now abandoned.

BACKGROUND OF THE INVENTION

This invention relates to an improved computer interface for interconnecting intelligent computer devices. More particularly, this invention relates to extensions and enhancements of the proposed American National Standard For Information Systems (ANSI) Small Computer System Interface-2 (SCSI-2), Rev. 10, described in ANSI document number X3.131-198X which is hereby incorporated by reference herein.

The SCSI-2 standard defines an I/O bus for interconnecting computers and peripheral devices. The bus can be operated over a wide range of data rates. The SCSI-2 standard provides specifications for mechanical, electrical and functional characteristics of the bus, including definitions of the physical characteristics of the bus conductors, the electrical characteristics of the signals that the conductors carry, and the meanings of those signals (e.g., control or data).

The standard further defines protocols for communicating between devices interconnected by the bus. Communication is allowed between only two devices at any given time (although up to eight devices may be interconnected by the same bus). When two devices communicate on the bus, one acts as an "initiator" and the other acts as a "target." The initiator originates an operation (i.e., requests an I/O process to be performed) and the target performs the operation.

Transfers on the bus are typically asynchronous (although a synchronous option is defined) and follow a "handshaking" protocol involving the exchange of a "Request" signal from a target and an "Acknowledge" signal from an initiator. This exchange takes place on conductors of the bus that are specifically dedicated to the handshaking task, and is performed in connection with each individual information transfer operation on the bus.

On a second logical level, the standard defines a message protocol for managing transfers on the bus. For example, a target may send a "Disconnect" message to inform an initiator that a present connection is going to be broken, and that a later reconnect will be required to complete the current I/O process. On yet another logical level, the standard defines a command and status structure. Commands are used by an initiator to request a target to perform particular I/O operations. At the completion of a command, or if for some reason a command cannot be completed by the target, the target sends a status byte to the initiator to inform the initiator of its condition.

The specifications of the SCSI-2 standard thus combine to define an interface having multiple protocol levels. The defined interface provides computer systems with device independence within a class of devices. For example, a variety of mass storage devices (such as disk drives, tape drives, optical drives, and memory caches), printers, microprocessors, and other devices can be added to a computer system without requiring modifications to system hardware or software. In addition, special features and functions of individual devices can be handled through the use of device-dependent fields and codes in the command structure.

The SCSI-2 standard further defines that initiator and target devices are daisy-chained together using a common 50-conductor "A" cable and, optionally, a 68-conductor "B" cable. When used alone, the 50-conductor A cable permits 8-bit wide data transfers. The addition of the B cable allows wider information transfers (data only) of 16 or 32 bits.

Although the SCSI-2 interface provides a convenient and powerful means for system interconnection, it has limitations. One important limitation is that messages, commands, and status information may only be transferred a single byte at a time on a designated group of eight data lines. Thus if a message, command, or status communication is more than one byte, as some of them are in the SCSI-2 protocol, separate transfer operations must be executed for each byte of the message, command, or status communication. This limits the speed of the interface. This limitation becomes particularly restrictive as computer devices become capable of responding to increasingly complicated (and longer) commands. This limitation also tends to make the prior art SCSI-2 interface less desirable for use within I/O systems in which intelligence is distributed among several processors throughout various components of the system.

An additional cost of transferring messages, commands and status information one byte at a time is that some process in each of the initiator and target devices must be executed to complete a transfer. The more message, command and status transfers that are required to perform a particular operation, the greater the burden these processes are on the respective devices.

This burden can be borne to some degree by commercially available integrated circuit chips that are designed to serve as the boundary between a "SCSI bus" and a device connected to that bus. Such commercially-available components generally have input/output terminals designed to transmit and receive the bus signals defined by the SCSI-2 standard in accordance with the electrical specifications of that standard. These components, however, typically do not have the capability to interpret the messages, commands or status information of higher protocol levels of the SCSI-2 standard, and therefore require the attention of other circuit components having that capability. For this reason, a typical SCSI circuit chip will generate interrupts each time there is a change in the signals on the SCSI bus to alert a more intelligent component, such as a microprocessor, that a change has occurred.

Servicing the interrupts generated by such a SCSI chip is a time-consuming process. In cases where the interrupts are serviced by a microprocessor, that microprocessor may be sacrificing time that could be spent on other tasks. Thus, it can be seen that, in cases where a general purpose microprocessor of a target or initiator device (e.g., a microprocessor in the controller of a mass storage device) is used to handle the interrupts generated by a SCSI chip, the requirement in the SCSI-2 standard that messages, commands and status information be sent in single byte transfers acts to increase the burden on the microprocessor, since that microprocessor must be involved with each byte transfer. This can be particularly disadvantageous in cases where a device, such as a target mass storage device, must respond to a large number of interrupts from its SCSI circuit chip during the course of a typical I/O operation.

In view of the foregoing, it would be desirable to provide an improved interface, based in part on the proposed SCSI-2 standard, which permits the parallel transfer of multiple-byte commands, messages, and/or status information.

It would also be desirable to be able to implement the protocol of such an improved interface in a manner such that data transfers across the interface can be accomplished without requiring burdensome attention from a processor in a device involved in the transfer.

SUMMARY OF THE INVENTION

It is therefore an object of the present invention to provide an improved interface, based in part on the proposed SCSI-2 standard, by which multiple-byte commands, messages, and/or status information can be transferred in a single parallel transfer.

It is also an object of the present invention to provide a circuit for implementing the protocol of such an improved interface that can execute data transfers with minimal need for the attention of a device processor.

It is another object of the present invention to provide an improved interface that can be implemented using conventional SCSI integrated circuits and other commercially available components.

These and other objects of the invention are accomplished in accordance with the principles of the invention by providing an interface (referred to hereafter as a SCSI-2E interface) comprising, in the preferred embodiment, a bus capable of simultaneously transferring at least 32 bits of data (plus at least 4 bits of parity data), and a microsequencer-driven interface unit for connecting devices to the bus.

A conventional 64-conductor cable has been found to be suitable for implementing the bus of this invention (referred to hereafter as a SCSI-2E cable), although cables of other widths may also be used. In addition to having data and parity lines for transferring 32 bits of data (and their associated parity bits) in parallel, the SCSI-2E cable includes nine dedicated control lines. The remaining lines provide paths for terminator power and ground. The various data, parity, control, and other lines may be arranged within the cable as desired.

The SCSI-2E interface offers several advantages over the prior art. For example, a single SCSI-2E cable replaces two prior art SCSI-2 cables (i.e., cables A and B). Also, the SCSI-2 A and B cables require separate "Request" and "Acknowledge" lines for each of the cables. These two sets of Request and Acknowledge lines are required to synchronize the transfer of data on cables A and B during multiple-byte parallel data transfers. Using the SCSI-2E interface, all four data bytes of a 32-bit wide parallel data transfer are synchronized with a single request signal and a single acknowledge signal. Moreover, with the SCSI-2E interface of the present invention a single request signal and a single acknowledge signal can be used to synchronize the simultaneous transfer of multiple bytes of message, command or status information.

The interface unit of the present invention can be implemented using commercially available integrated circuit components. The interface unit preferably includes a circuit for controlling the timing of signals on the bus and for generating interrupts in response to changes in the signals on the bus (e.g., a commercially-available SCSI integrated circuit chip), and a microsequencer circuit for controlling the operation of the timing control circuit. The microsequencer operates under the control of a microprocessor in the device to which the interface unit is attached, and handles interrupts generated by the timing control circuit during message/command/status information transfers, thereby preventing that circuit from overburdening the microprocessor.

The SCSI-2E cable and interface unit of this invention preferably transfer all information, including data, commands, status information, and messages, in 32-bit words. The prior art SCSI cables are capable of transferring commands, messages, and status information only on the data path of cable A, with a maximum size of eight bits. The SCSI-2E interface of the present invention therefore significantly enhances command, message and status information transfers between devices connected via the SCSI-2E cable and interface units.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 5 is a table of exemplary messages, and their corresponding message code words and attributes, for use in implementing a message protocol to manage communication on the SCSI-2E interface bus of the present invention;

DETAILED DESCRIPTION OF THE PREFERRED EMBODIMENTS

Figure 1A:
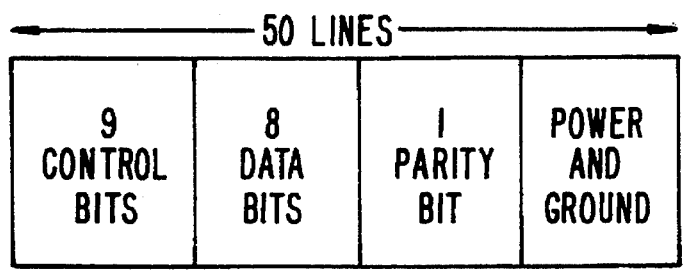
FIGS. 1a and 1b are diagrams of the lines of a prior art SCSI-2 interface bus.
Figure 1B:
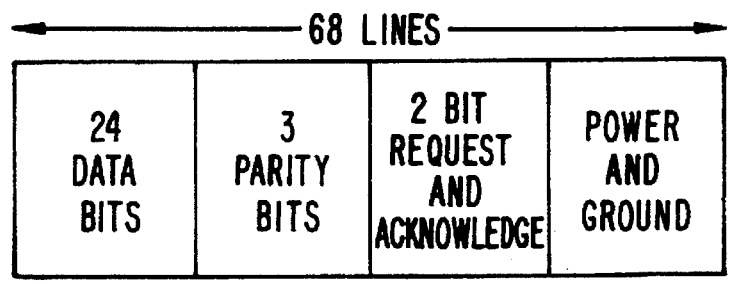

Referring now to the drawings, FIGS. 1a and 1b are diagrams of the prior art SCSI-2 cables. Cable "A," shown in FIG. 1a, is a 50-conductor cable, with nine control lines (including two lines for "request" and "acknowledge" functions), eight data lines, and a single parity line. The remaining lines are used as terminator power and ground lines. In FIG. 1a, the various lines of cable A are shown grouped according to their respective functions. Table 1 below illustrates the particular designations of the 50 conductors of cable A as specified by the SCSI standard.

TABLE 1

| Signal Name | Cable A Conductor | | Signal Name |
|---|---|---|---|
| GROUND | 1 | 2 | -DB(0) |
| GROUND | 3 | 4 | -DB(1) |
| GROUND | 5 | 6 | -DB(2) |
| GROUND | 7 | 8 | -DB(3) |
| GROUND | 9 | 10 | -DB(4) |
| GROUND | 11 | 12 | -DB(5) |
| GROUND | 13 | 14 | -DB(6) |
| GROUND | 15 | 16 | -DB(7) |
| GROUND | 17 | 18 | -DB(P) |
| GROUND | 19 | 20 | GROUND |
| GROUND | 21 | 22 | GROUND |
| RESERVED | 23 | 24 | RESERVED |
| OPEN | 25 | 26 | TERMPWR |
| RESERVED | 27 | 28 | RESERVED |
| GROUND | 29 | 30 | GROUND |
| GROUND | 31 | 32 | -ATN |
| GROUND | 33 | 34 | GROUND |
| GROUND | 35 | 36 | -BSY |
| GROUND | 37 | 38 | -ACK |
| GROUND | 39 | 40 | -RST |
| GROUND | 41 | 42 | -MSG |
| GROUND | 43 | 44 | -SEL |
| GROUND | 45 | 46 | -C/D |
| GROUND | 47 | 48 | -REQ |
| GROUND | 49 | 50 | -I/O |

Cable "B," shown in FIG. 1b, is a 68-conductor cable. Cable B consists of 24 data lines and three parity lines (one parity bit per eight data bits), two lines for "request" and "acknowledge" functions, and terminator power and ground lines. As with cable A and FIG. 1a, the various lines of cable B are grouped in FIG. 1b according to their respective functions. Table 2 below illustrates the particular designations of the 68 conductors of cable B as specified by the SCSI standard.

TABLE 2

| Signal Name | Cable B Conductor | | Signal Name |
|---|---|---|---|
| GROUND | 1 | 2 | GROUND |
| GROUND | 3 | 4 | -DB(8) |
| GROUND | 5 | 6 | -DB(9) |
| GROUND | 7 | 8 | -DB(10) |
| GROUND | 9 | 10 | -DB(11) |
| GROUND | 11 | 12 | -DB(12) |
| GROUND | 13 | 14 | -DB(13) |
| GROUND | 15 | 16 | -DB(14) |
| GROUND | 17 | 18 | -DB(15) |
| GROUND | 19 | 20 | -DB(P1) |
| GROUND | 21 | 22 | -ACKB |
| GROUND | 23 | 24 | GROUND |
| GROUND | 25 | 26 | -REQB |
| GROUND | 27 | 28 | -DB(16) |
| GROUND | 29 | 30 | -DB(17) |
| GROUND | 31 | 32 | -DB(18) |
| TERMPWRB | 33 | 34 | TERMPWRB |
| TERMPWRB | 35 | 36 | TERMPWRB |
| GROUND | 37 | 38 | -DB(19) |
| GROUND | 39 | 40 | -DB(20) |
| GROUND | 41 | 42 | -DB(21) |
| GROUND | 43 | 44 | -DB(22) |
| GROUND | 45 | 46 | -DB(23) |
| GROUND | 47 | 48 | -DB(P2) |
| GROUND | 49 | 50 | -DB(24) |
| GROUND | 51 | 52 | -DB(25) |
| GROUND | 53 | 54 | -DB(26) |
| GROUND | 55 | 56 | -DB(27) |
| GROUND | 57 | 58 | -DB(28) |
| GROUND | 59 | 60 | -DB(29) |
| GROUND | 61 | 62 | -DB(30) |
| GROUND | 63 | 64 | -DB(31) |

TABLE 2-continued

| Signal Name | Cable B Conductor | | Signal Name |
|---|---|---|---|
| GROUND | 65 | 66 | -DB(P3) |
| GROUND | 67 | 68 | GROUND |

The A and B cables can be operated to transfer 32 bits of data in parallel by operating cable B as a slave to cable A. This is accomplished according to the SCSI-2 standard by synchronizing the ACKB and REQB signals on conductors 22 and 26 of cable B with their respective counterpart signals ACK and REQ on conductors 38 and 48 of cable A.

Figure 2:
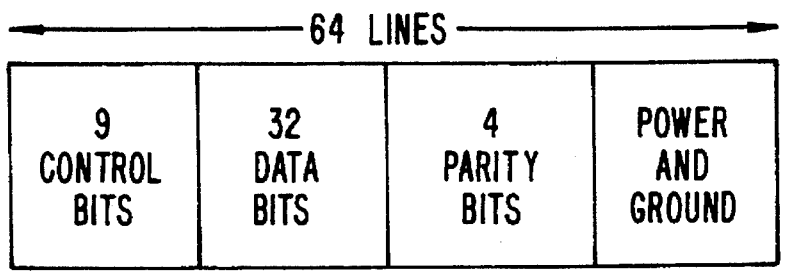
FIG. 2 is a diagram of the lines of a SCSI-2E interface bus constructed in accordance with the principles of this invention.

FIG. 2 is a diagram of a SCSI-2E bus in accordance with the principles of this invention. The SCSI-2E cable preferably is a single, 64-conductor cable which includes nine control lines, 32 data lines, and four parity lines. The data lines are segregated into four groups of eight, with one parity bit per eight data bits. The remaining lines may be used as terminator power and ground lines. Table 3 below illustrates an exemplary assignment of particular bus signals to the 64 conductors of the cable of the present invention.

TABLE 3

| Signal Name | SCSI-2E Cable Conductor | | Signal Name |
|---|---|---|---|
| GROUND | 1 | 2 | -ATN |
| -SEL | 3 | 4 | GROUND |
| -I/O | 5 | 6 | -RST |
| GROUND | 7 | 8 | -MSG |
| -REQ | 9 | 10 | POWER |
| GROUND | 11 | 12 | -D(00) |
| -D(01) | 13 | 14 | -D(02) |
| -D(03) | 15 | 16 | GROUND |
| -D(04) | 17 | 18 | -D(05) |
| GROUND | 19 | 20 | -D(06) |
| -D(07) | 21 | 22 | -D(08) |
| -D(09) | 23 | 24 | GROUND |
| -D(10) | 25 | 26 | -D(11) |
| GROUND | 27 | 28 | -D(12) |
| -D(13) | 29 | 30 | -D(14) |
| -D(15) | 31 | 32 | GROUND |
| -D(16) | 33 | 34 | -D(17) |
| GROUND | 35 | 36 | -D(18) |
| -D(19) | 37 | 38 | -D(20) |
| -D(21) | 39 | 40 | GROUND |
| -D(22) | 41 | 42 | -D(23) |
| GROUND | 43 | 44 | -D(24) |
| -D(25) | 45 | 46 | -D(26) |
| -D(27) | 47 | 48 | GROUND |
| -D(28) | 49 | 50 | -D(29) |
| GROUND | 51 | 52 | -D(30) |
| -D(31) | 53 | 54 | -D(P0) |
| -D(P1) | 55 | 56 | GROUND |
| -D(P2) | 57 | 58 | -D(P3) |
| -C/D | 59 | 60 | POWER |
| GROUND | 61 | 62 | -BSY |
| -ACK | 63 | 64 | GROUND |

The SCSI-2E bus may, alternatively, include more than one cable, or may include more or less than 64 conductors (e.g., by varying the number of ground lines). The number of conductors may be selected to accommodate a standard cable size. Regardless of the type of cable or number of cables used in implementing the present invention, however, it will be appreciated that, upon consideration of the detailed description of the invention herein, the transfer of all data, message, command and status bytes across the interface can be synchronized with a single request signal from a first device connected to the SCSI-2E bus and a single acknowledge signal from a second device connected to the SCSI-2E bus.

Like the standard SCSI-2 interface, the SCSI-2E interface of the present invention can be used to interconnect a variety of devices. Such devices may include mass storage devices (e.g., disk drives, tape drives, optical drives, and memory caches), printers, and microprocessors.

In a preferred embodiment, the SCSI-2E interface of the present invention is used to interconnect a mass storage device controller to a plurality of mass storage devices. More particularly, the mass storage devices of the preferred embodiment each comprises one or more arrays of disk drives. Each array is operated under the control of an array controller that communicates with the aforementioned mass storage device controller via the SCSI-2E interface of the present invention.

Figure 3:
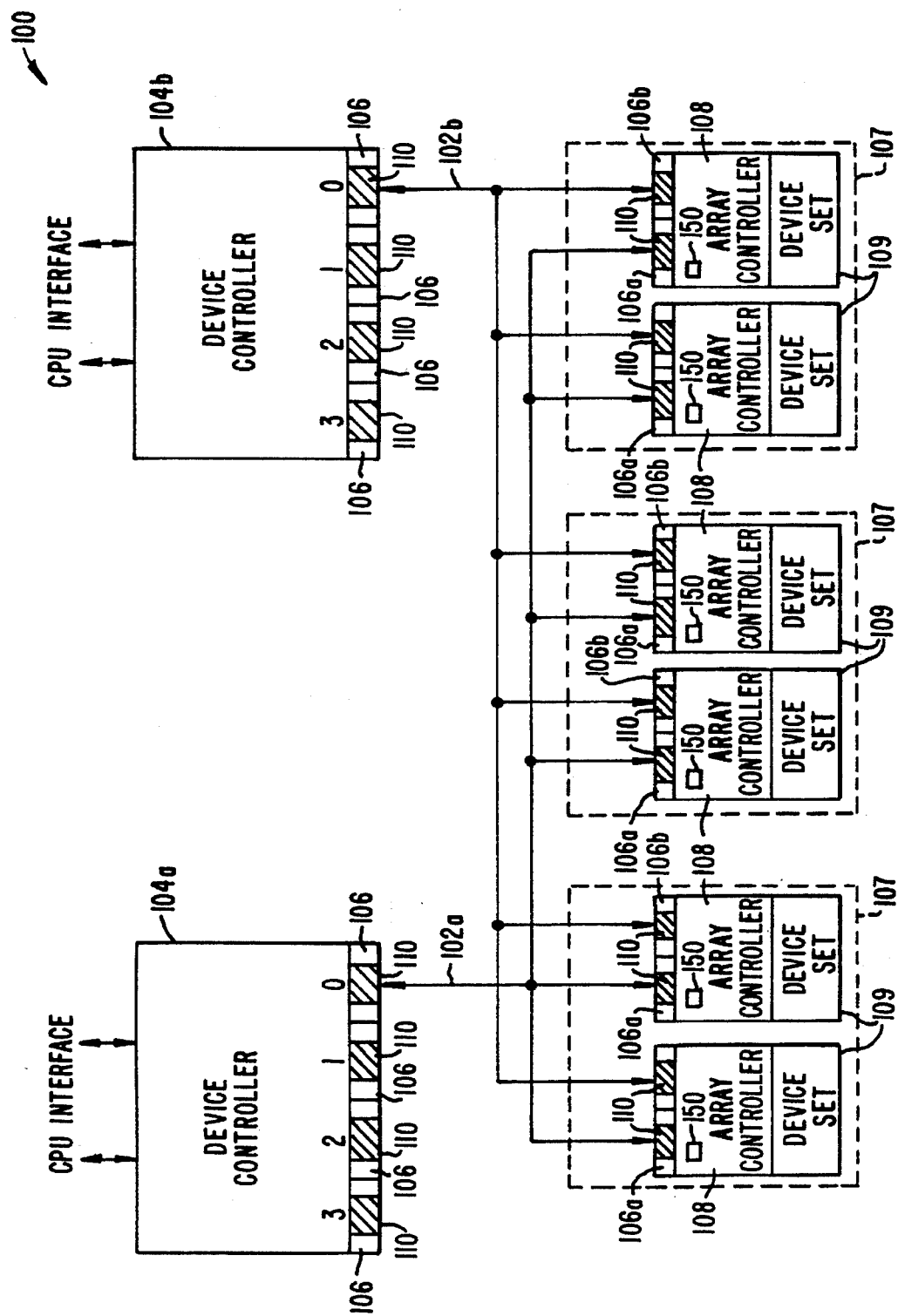
FIG. 3 is a block diagram of a system in which the SCSI-2E interface bus of FIG. 2 is suitable for use in accordance with the principles of the present invention.

FIG. 3 shows an example of a system 100 in which the SCSI-2E interface of the present invention can be used and which is well-suited to illustrate the present invention. In this system, two SCSI-2E buses 102a and 102b are used to interconnect, respectively, two device controllers 104a and 104b with a plurality of mass storage devices 107. Each of device controllers 104a and 104b has a plurality of data ports 106(0)–(3) for communicating with the mass storage devices 107. Each storage device 107 includes two array controllers 108 and a pair of associated device sets 109 (e.g., disk drive arrays). Each array controller 108 has two data ports 106a and 106b that are connected to permit the array controller to communicate independently (and, if desired, simultaneously) with each of device controllers 104a and 104b.

More specifically, SCSI-2E bus 102a connects the data port 106(0) of device controller 104a to the data ports 106a of each array controller 108 in system 100. Likewise, SCSI-2E bus 102b connects the data port 106(0) of device controller 104b to the data ports 106b of each array controller 108 in system 100. Device controllers 104a and 104b act as "initiators," and array controllers 108 as "targets," as those terms have been previously defined. Device controllers 104a and 104b are also referred to herein by the term "PAA" (Parallel Array Adapter), and array controllers 108 are also referred herein to by the term "PAC" (Parallel Array Controller).

SCSI-2E buses 102a and 102b are identical. For purposes of convenience, reference will be made in the following discussion to SCSI-2E bus 102a only, it being understood that the following discussion applies to bus 102b as well.

Array controllers 108 are interconnected by SCSI-2E bus 102a in a daisy-chain manner. This can be accomplished by providing a bi-directional cable terminated at one end by data port 106(0) of device controller 104a and at the other end by one of data ports 106a, and having taps along its length for connecting branch cables to the other data ports 106a in system 100.

Figure 4:
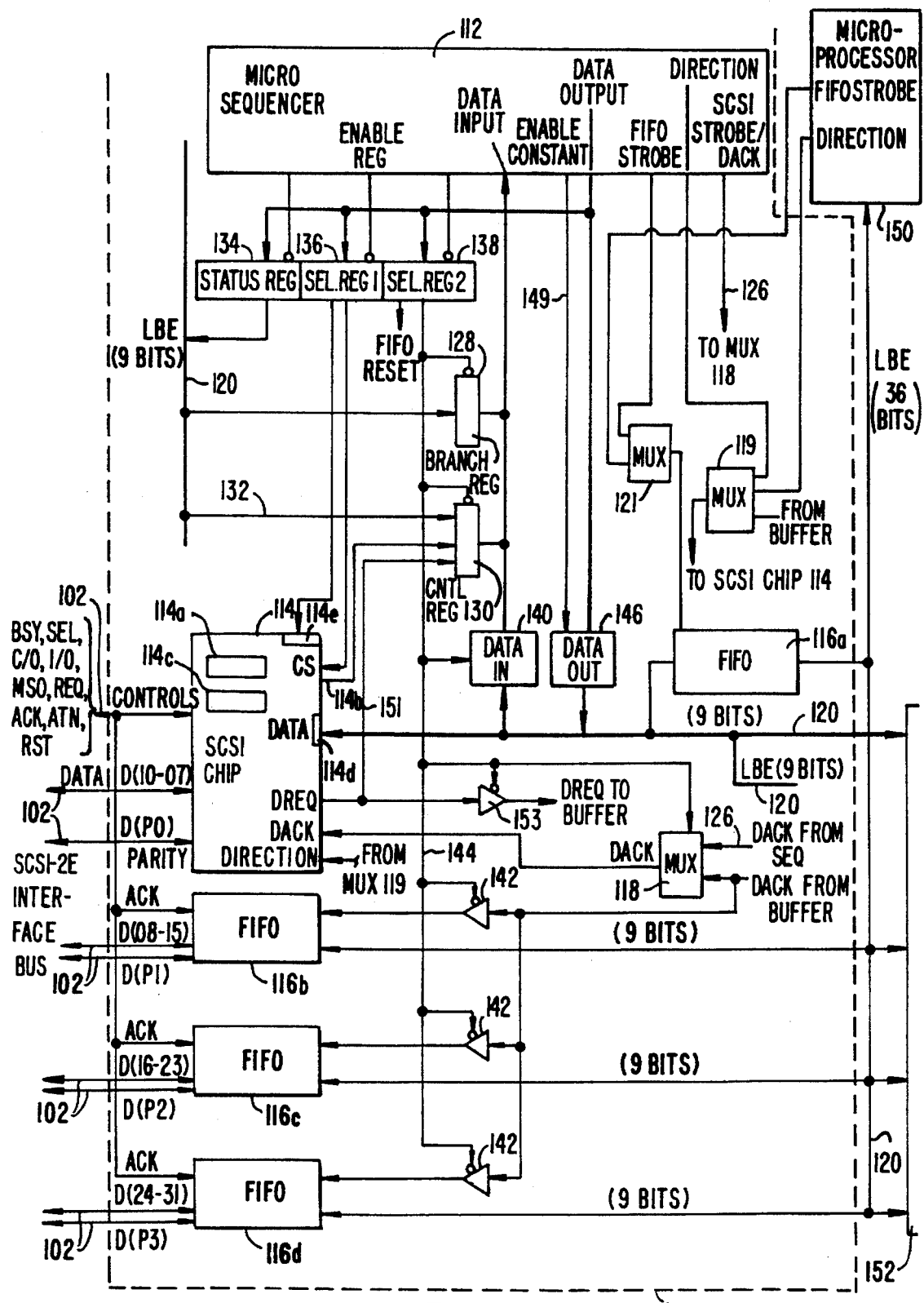
FIG. 4 is a block diagram of a preferred embodiment of an interface unit constructed in accordance with the principles of this invention.

Within each data port 106 (including data ports (0)–(3) of device controller 104a and data ports 106a of mass storage devices 107) sits a SCSI-2E interface unit 110. FIG. 4 shows a preferred embodiment of interface unit 110, constructed in accordance with the principles of this invention. The particular embodiment of interface unit 110 shown in FIG. 4 and described hereafter is designed for use in array controller 108. It is to be appreciated, however, that the same circuit can be implemented for use in a variety of devices, including both initiator and target devices, with only minor modifications.

It is to be appreciated also that the interface of the present invention can be implemented using interface units other than the embodiment described herein. For example, the interface unit embodiment described herein is driven by a microsequencer circuit to reduce the amount of time that a processor must be involved in the operation of the interface unit. However, in some devices such a processor-time-saving design may be unnecessary, and an interface unit driven directly by a processor in the device may be preferred.

Referring again to FIG. 3, device controller 104a initiates a data transfer by "selecting" an array controller 108, and sends commands (e.g., read data) to the selected array controller via SCSI-2E bus 102a. The interface unit 110 within the data port 106a of the selected array controller receives the commands, and then sends the commands to array controller 108. While array controller 108 performs the commands, interface unit 110 preferably "disconnects" from SCSI-2E bus 102a, to permit device controller 104a to perform other operations (i.e., with other interface units and with other storage devices). Interface unit 110 "reselects" the same device controller 104a when array controller 108 has executed the command and is ready to reconnect to controller 104a.

The manner in which the steps of "select," "disconnect," "reselect" and other operations relating to the management of communication on bus 102a are performed is determined by the protocol of the SCSI-2 interface. In many respects, this protocol may, if desired, follow the standard SCSI-2 protocol, modified only as necessary to account for the parallel transfer of multiple byte messages, commands and status information. For example, the SCSI-2 standard defines eight distinct bus phases: BUS FREE, ARBITRATION, SELECTION, RESELECTION, COMMAND, DATA, STATUS and MESSAGE. These phases are defined by certain bus control signals which are specified by the SCSI-2 standard and are identified below. Preferably, the interface of the present invention is implemented using these same bus control signals and bus phases.

Likewise, the control information transferred during the COMMAND, STATUS and MESSAGE phases may follow the SCSI-2 standard, or a variation thereof. For example, a subset of messages that might be used in implementing the interface of the present invention is shown in FIG. 5. Some of these messages (e.g., "Command Complete") are the same as in the SCSI-2 standard, except that they are transferred in words, and not single bytes. A brief description of each message shown in FIG. 5 follows.

"Command Complete (00)": This message word is sent from the array controller to the device controller after the array controller performs an operation requested by the device controller and sends an end response packet (i.e., a status communication), "Selected With Disconnect (01)": This message word is sent from the device controller to the array controller on initial selection.

"Disconnect With Initiator Waiting (02)": This message word is sent from the array controller to the device controller when the array controller is not ready to continue or complete an operation and wants to disconnect.

"Disconnect (03)": This message word is sent from the device controller to the array controller when the device controller is not ready to continue or complete an operation and wants the array controller to disconnect.

"Disconnect with Interrupt Pending (04)": This message word is sent from the array controller to the device controller in response to the above Disconnect (03) Message Code.

"Abort All (05)": This message word is sent from the device controller to the array controller when the device controller wants the array controller to abort all prior commands that the device controller has sent to the array controller and that have not yet been executed. The commands already in execution are terminated and responses to these commands are not sent to the device controller.

"Status Transfer Size (12)": These message words are sent from the array controller to the device controller at the end of a data transfer and if the array controller is ready to transfer the end response packet.

"Unsolicited Interrupt (1F)": These message words are sent from the array controller to the device controller in order to send an unsolicited message.

"Continue Data Transfer (20)": These message words are sent from the array controller to the device controller in order to continue a data transfer.

"Continue Data Transfer (21)": These message words are sent from the device controller to the array controller in order to continue a data transfer and also to change the transfer size.

"Reselected for Data (30)": These message words are sent from the array controller to the device controller on reselection to inform the device controller that the reselection is for a data transfer.

"Reselected for Status (32)": These message words are sent from the array controller to the device controller on reselection to inform the device controller that the reselection is for an end response packet.

"Reconnected (33)": These message words are sent from the device controller to the array controller on reconnection.

"Initiator Detected Error (35)": These message words are sent from the device controller to the array controller if an error is detected by the device controller during an information transfer.

Each message in the set of FIG. 5 is a multiple byte message. Referring to FIG. 5, the leftmost column of the message table, under the heading Message Word 00, indicates the Message Code corresponding to each message. Each Message Code is four bytes wide, although for each of the messages in the set of FIG. 5 the upper three bytes are undefined and may be any value. The other columns of FIG. 5 indicate attributes that are associated with the Message Codes and that form a part of each message. As can be seen, some messages have no attributes, and are thus only one word in length. Other messages have one, two or three words of attributes. The messages are transferred across bus 102a one word at a time, and thus messages comprising the group generally designated 500 can be sent in a single parallel transfer, those in group 502 can be sent in two transfers, those in group 504 in three transfers and those in group 506 in four. In comparison, a sixteen byte message such as is shown in group 506 would require sixteen separate transfers on a conventional SCSI-2 bus (assuming all bytes, including the three bytes of the Message Code word having undefined values, are transferred).

FIGS. 6–10 illustrate an exemplary protocol for the SCSI-2E interface of the present invention utilizing messages such as those described above. A more detailed description of some of the operations illustrated by FIGS. 6–10 is provided following the detailed description below of interface unit 110 of FIG. 4. It is to be appreciated, however, that a variety of protocols other than the embodiment described herein may be used to operate the SCSI-2E bus and interface units of the present invention.

As shown in FIG. 4, interface unit 110 includes a programmable microsequencer 112, SCSI chip 114, first-in first-out (FIFO) storage circuits 116a–116d, multiplexers 118, 119, 121, and various registers and drivers. The circuit components of interface unit 110 may be implemented using commercially-available integrated circuit chips, as is described in greater detail below. Interface unit 110 transfers device-dependent information (e.g., commands and data) between the SCSI-2E interface bus 102a and a bus (which is designated by reference numeral 120) connected to array controller 108. Interface 110 also transmits and receives over the SCSI-2E interface bus 102a device-independent information (e.g., messages and control signals) for managing communication between the interface units 110 connected by the SCSI-2E bus. As is described further below, the aforementioned control signals are handled by SCSI chip 114. The messages, on the other hand, like commands and data, are passed on to microsequencer 112 and array controller 108 for handling.

The data and parity lines of SCSI-2E bus 102a connect to interface unit 110 in parallel, via bi-directional SCSI chip 114 and bi-directional FIFO circuits 116b–116d. In FIG. 4, the ground and power lines of bus 102a are not shown. Also not shown (to avoid making the figure unnecessarily complicated) are parity check circuits, which may be connected and used in interface unit 110 in a conventional manner to validate transfers on the various data lines within, or connected to, the interface unit. Each of FIFO circuits 116b–d receives eight data bits and one parity bit via the SCSI-2E bus. The remaining eight bits of data (D(00)–D(07)) and the corresponding parity bit (D(P0)) pass through a FIFO circuit internal to SCSI chip 114, before being transmitted to FIFO circuit 116a. Chips suitable for use as FIFO circuits 116a–d in the present invention are commercially available from Cypress Semiconductor, San Jose, Calif., model number CY7C409 64×9 FIFO. If desired, additional data and parity lines may be added by adding additional FIFO circuits, connected in the same manner as shown with respect to FIFO circuits 116b–116d. Cable width may be expanded and/or additional cables may be added if desired to overcome constraints caused by the cable width.

SCSI chip 114 also receives control signals from the nine control lines of bus 102a. These nine control lines, and the bus signals they carry, are the same as those of the "A" cable of the standard SCSI-2 interface. As set forth in Tables 1 and 3, these control signals are: "busy (BSY)," "select (SEL)," "control/data (C/D)," "input/output (I/O)," "message (MSG)," "request (REQ)," "acknowledge (ACK)," "attention (ATN)," and "reset (RST)." For a further discussion of these bus signals, the reader is referred to the above-referenced SCSI-2 ANSI standard document.

SCSI chip 114 is the main communication and bus control hardware of interface unit 110. SCSI chip 114 controls the timing and handshaking (e.g., request and acknowledge signals) for transfers across bus 102a. Chips suitable for use as the SCSI chip 114 in the present invention are commercially available from NCR Microelectronics, Colorado Springs, Colo., model Nos. NCR53C90A and 53C90B (either chip version may be used). SCSI chip 114 receives instructions from microsequencer 112 via a command register 114a in SCSI chip 114, and generates interrupt signals for the microsequencer when it has completed the assigned instructions (or when a change in the signals on bus 102a for which SCSI chip 114 has been instructed to wait takes place). The interrupt signals are generated by setting a bit in control register 130 associated with microsequencer 112, via interrupt line 114*b*.

Microsequencer 112 analyzes interrupts generated by SCSI chip 114 by reading interrupt status register 114*c* of the chip. Interrupt status register 114*c* is an addressable register. Microsequencer 112 accesses interrupt status register 114*c*, and other addressable registers of SCSI chip 114 such as command register 114*a*, by supplying the appropriate register address via select register 136 to the register address terminals 114*e* of chip 114 and selecting the chip via its chip select ("CS") terminal. The contents of the addressed register can then be read from (and written to) using data terminals 114*d*.

As is described in greater detail hereafter, the operation of microsequencer 112 is initiated by a command from a general purpose microprocessor 150 associated with the array controller 108. Microprocessor 150 interfaces with microsequencer 112 via a 9-bit wide bus (eight data bits plus one parity bit). This 9-bit wide bus comprises the least significant byte of a larger 36-bit wide local bus extension (LBE) 120 that connects microprocessor 150 with other components of array controller 108, and that connects the 36 bit wide data path of interface unit 110 to a data buffer 152 in array controller 108. For the purpose of simplifying FIG. 4, the same 9-bit wide portion of bus 120 is shown at two separate locations (i.e., in the upper left hand corner and middle right of FIG. 4); both represent the least significant byte portion of bus 120.

In response to commands from microprocessor 150, microsequencer 112 prepares interface unit 110 for receiving or transmitting message/command/status information over the SCSI-2E bus 102*a*, and is also responsible for transferring information from SCSI chip 114 to FIFO circuit 116*a*. Microsequencer 112 handles all interrupts from SCSI chip 114 during message/command/status information transfers, thereby preventing the SCSI chip from overburdening microprocessor 150 of array controller 108. When data is being transferred across SCSI-2E bus 102*a* (i.e., when bus 102*a* is in the DATA phase), interface unit 110 is controlled by the general purpose microprocessor 150, and microsequencer 112 is in an idle state. A programmable microsequencer suitable for use in the present invention is commercially available from Advanced Micro Devices, Inc., Sunnyvale, Calif., model No. Am29CPL154. An example of a program for this model microsequencer for use in interface unit 110 is provided at the end of the description portion of this application. One skilled in the art will appreciate that a microprocessor could be used in place of microsequencer 112 without departing from the spirit of the invention. Such a microprocessor, in addition to performing the functions of microsequencer 112, could perform other processes related to data handling and data transfers (e.g., error handling functions).

FIFO circuits 116*b*–116*d* are used to extend the number of data lines in the interface. Each FIFO circuit adds data-transfer capability of, e.g., eight data bit signals plus a parity bit signal, to the interface, and includes the control logic needed to hold the data on a first-in, first-out basis. FIFO circuits 116*b*–116*d* operate in synchronism with SCSI circuit 114 when transferring information to or from bus 102*a*. In a target device, such as array controller 108, FIFO circuits 116*b*–116*d* are synchronized with SCSI chip 114 using the "Acknowledge (ACK)" signal from bus 102*a*, as shown in FIG. 4. In an initiator device, the "Request (REQ)" signal from bus 102*a* is used instead as the synchronizing signal.

In either a target or an initiator device, the "Input/Output (I/O)" signal from bus 102*a* may be used to provide a control signal to FIFO circuits 116*b*–116*d* to determine whether the FIFO circuits are to read data from or write data to bus 102*a* in response to the synchronizing ACK/REQ signal. It is to be appreciated that FIFO circuits of different conventional types can be used to implement FIFOs 116*b*–116*d*, and thus the particular signals required to control the FIFOs (e.g., select, shift in, shift out, input ready, output ready, reset) are implementation specific. It is well within the skill, and the discretion, of one in the art of digital circuit design to provide any logic circuits that may be necessary, in addition to those shown in FIG. 4, to operate FIFO circuits 116*b*–116*d* in accordance with the principles of the present invention as described herein.

Control signals for managing the timing and flow of information through interface unit 110 are routed via various multiplexer, register and other logic circuits. FIG. 4 illustrates the signal paths for exemplary ones of these control signals. Again, these control signals may vary depending on the particular circuit components used in implementing interface unit 110, and it is within the skill and discretion of the circuit designer to choose the particular manner in which the timing and flow of information through interface unit 110 is to be controlled.

Generally, during the operation of interface unit 110, bus 120 serves several purposes. It operates as the conduit for instructions to be passed from microprocessor 150 to microsequencer 112, and for status information to be sent in return from microsequencer 112 to microprocessor 150. It also operates as the conduit for microsequencer 112 to pass instructions to SCSI chip 114, and for SCSI chip 114 to provide status information to microsequencer 112 in return. It further operates as the conduit for commands and messages to be passed between bus 102*a* and microprocessor 150, and for data to be passed between bus 102*a* and the mass storage devices of device set 109. A typical I/O operation will require bus 120 to serve these various purposes at different times during the operation. Control of bus 120 is therefore shared by microprocessor 150, microsequencer 112 and SCSI chip 114, as described further below.

Transfers on bus 120 are accomplished using a handshaking protocol involving a request signal and an acknowledge signal between the particular components that are communicating on the bus. For example, when SCSI chip 114 and FIFO circuits 116*b*–116*d* receive data from bus 102*a*, and are ready to transfer the first word of data to buffer 152, SCSI chip 114 and FIFO circuits 116*b*–116*d* each place their respective byte (plus parity bit) on bus 120, and SCSI chip 114 generates a request signal on line 151 at the same time. SCSI chip 114 and FIFO circuits 116*b*–116*d* then wait for an acknowledge signal from buffer 152 before placing the next data word on bus 120. Line 151 supplies the request signal to buffer 152 via driver 153. Buffer 152 responds to the request signal by reading the data on bus 120 and supplying an acknowledge signal on line 124 when the data on bus 120 has been read. The acknowledge signal is provided to SCSI chip 114 via multiplexer 118, and to FIFO circuits 116*b*–116*d* via drivers 142.

The data transfer process repeats itself until all data words received by SCSI chip 114 and FIFO circuits 116*b*–116*d* from bus 102*a* have been transferred (SCSI chip 114 and FIFO circuits 116*b*–116*d* may continue to receive data from bus 102*a* while they are transferring previously received data on bus 120), and is normally accomplished without the intervention of microsequencer 112. SCSI chip 114 has a count register that is loaded by microprocessor 150 prior to the data transfer with the transfer size. The count is decremented by SCSI chip 114 with each data transfer on bus 102. When the transfer is complete SCSI chip 114 interrupts microprocessor 150 to notify the processor that the data transfer is done.

When data is to be transferred from buffer 152 to bus 102a, SCSI chip 114 is again provided with a count of the data to be transferred and asserts a request signal on line 151, in response to which buffer 152 puts a word of data on bus 120 and supplies an acknowledge signal to SCSI chip 114 and FIFO circuits 116b–116d. This exchange repeats itself as previously described until the counter in SCSI chip 114 reaches zero and when the transfer is complete SCSI chip 114 interrupts microprocessor 150.

As previously stated, bus 120 is used to transfer messages and commands. Such transfers are controlled by microsequencer 112 under the direction of microprocessor 150. For example, when interface unit 110 receives a message from bus 102a, SCSI chip 114 interrupts microsequencer 112. Microsequencer 112 analyzes interrupt status register 114c to determine the nature of the interrupt, and transfers the first message byte received by SCSI chip 114 to FIFO 116a for microprocessor 150 to read. This message byte, which is the lowest byte of the first word of the message, is the Message Code, as shown in FIG. 5.

If the Message Code indicates that additional message words follow, microsequencer 112 transfers the additional byte(s) from SCSI chip 114 to FIFO circuit 116a. If the message indicates that the interface unit is to receive a command, microsequencer 112 in turn instructs SCSI chip 114 to enter the COMMAND phase to receive the command.

Command bytes received by SCSI chip 114 (the lowest byte of each command word) are placed into FIFO circuit 116a by microsequencer 112 for microprocessor 150 to read. The upper three bytes of each command word are received respectively by FIFO circuits 116b–116d, are read directly from those FIFO circuits by microprocessor 150. A command preferably includes a checksum byte which is checked by the microprocessor; if valid, the microprocessor instructs the microsequencer to disconnect interface unit from bus 102a while array controller 108 performs the command.

When a message is to be sent by interface unit 110 during the MESSAGE bus phase, microprocessor 150 places the bytes of the message into FIFO circuits 116a–116d. Microprocessor 150 then instructs microsequencer 112 to transfer the message, in response to which microsequencer 112 reads the first message byte in FIFO 116a and supplies the byte to the data terminals 114d of SCSI chip 114. SCSI chip 114 transfers this byte to data lines D(00)–(07) of bus 102a and, at the same time, FIFO circuits 116b–116d place the message bytes stored therein onto data lines D(08)–D(31). Parity bits are also transferred to the bus.

During MESSAGE and COMMAND phases, transfers on bus 120 follow a request/acknowledge protocol between SCSI chip 114 and microsequencer 112. During the DATA phase, SCSI chip 114 generates the request signals, but now the acknowledge signals come from buffer 152 instead of from microsequencer 112.

The multiplexing of various control signals used to transfer information on bus 120 is illustrated in FIG. 4. Multiplexer 118 is used by microsequencer 112 to select data acknowledge signals (DAck) from data buffer 152 connected to bus 120 (via line 124) or from microsequencer 112 (via line 126). The output of multiplexer 118 is provided to a DAck input terminal of SCSI chip 114, and as previously discussed, indicates that data has been received by either buffer 152 or microsequencer 112. A second multiplexer 119 multiplexes a "Direction" signal from microsequencer 112, another "Direction" signal from microprocessor 150, and a third "Direction" signal from buffer 152. The output of multiplexer 119 is supplied to a "Direction" input terminal of SCSI chip 114. The Direction signal determines the direction of information flow on bus 120. A third multiplexer 121 multiplexes a first "FIFO Strobe" signal from microsequencer 112 and a second "FIFO Strobe" signal from microprocessor 150. The output of multiplexer 121 is a write/read clock pulse to FIFO circuit 116a, which serves to control the flow of information between FIFO circuit 116a and bus 120.

Communication signals between microprocessor 150 and microsequencer 112 are channeled through two registers, "branch" register 128 and "control" register 130. The microprocessor sets a branch address in branch register 128 to instruct microsequencer 112 to perform a function. Microprocessor 150 then sets a "GO" bit in control register 130 via line 132 to cause the microsequencer to execute the function indicated by branch register 128.

As previously described, microsequencer 112 responds to interrupts generated by SCSI chip 114. Microsequencer 112 typically sets a status code in "status" register 134 after servicing an interrupt. Status register 134 may be an eight bit register, and is used to inform microprocessor 150 of the status of events on bus 102a (e.g., the array controller has been selected or reselected by a device controller). Microsequencer 112 uses "select" registers 136 or 138 to communicate with various components of the hardware of interface unit 110. For example, microsequencer 112 selects SCSI chip 114 and addresses the registers of SCSI chip 114 via select register 136. Microsequencer 112 uses select register 138 to: reset FIFO circuits 116a–d (as discussed below); select control register 130, branch register 128, or "Data In" register 140; and to control multiplexer 118 and drivers 142 for enabling/disabling transfers between SCSI chip 114/ FIFOs 116b–d and buffer 152. Tables 4 and 5 show illustrative functions for certain bits of select registers 136 and 138. A more detailed assignment of the bits of registers 136 and 138 and other registers of interface unit 110 can be found in the definition portion of the microsequencer program at the end of this application.

TABLE 4

Select Register 136

| | |
|---|---|
| Bit 7: | Select SCSI chip |
| Bit 6: | Reserved for other function |
| Bit 5: | Reserved for other function |
| Bit 4: | Reserved for other function |
| Bit 3: | SCSI register address (msb) |
| Bit 2: | SCSI register address |
| Bit 1: | SCSI register address |
| Bit 0: | SCSI register address (lsb) |

TABLE 5

Select Register 138

| | |
|---|---|
| Bit 7: | FIFO reset |
| Bit 6: | Reserved for other function |
| Bit 5: | Reserved for other function |
| Bit 4: | Reserved for other function |
| Bit 3: | Disable buffer transfer |
| Bit 2: | Select Data In register 140 |

TABLE 5-continued

Select Register 138

| Bit 1: | Select Control register 130 |
|---|---|
| Bit 0: | Select Branch register 128 |

When microsequencer 112 is controlling interface unit 110 (e.g., during MESSAGE and COMMAND phases), each of the drivers 142, which enable FIFO circuits 116*b–d* to receive acknowledge signals from buffer 152, are disabled. When the microsequencer is not in control of interface unit 110 (e.g., during the DATA phase), microsequencer 112 resets a bit (Bit 3) in select register 138, which enables drivers 142 via line 144. Data can then be transferred between FIFO circuits 116*b–d* (and SCSI chip 114) and buffer 152. Microprocessor 150 also may read the internal registers of SCSI chip 114 via bus 120 when bit 3 of select register 138 is reset.

Data In register 140 and Data Out register 146 each include nine latched drivers (one for each of eight data bits and one parity bit). Registers 140 and 146 are connected between the "data input" and "data output" pins, respectively, of microsequencer 112, and the lines of data bus 120 which connect SCSI chip 114, and FIFO circuit 116*a*. An "Enable Constant" signal 149 latches data from microsequencer 112 into register 146. Register 146 is used to load the SCSI chip internal registers (the SCSI register address is selected by setting bits 3–0 of select register 136). Similarly, register 140 registers data from SCSI chip 114 for microsequencer 112 to read. Microsequencer 112 can also read data from FIFO 116*a* via register 140, and can provide diagnostic information to microprocessor 150 via register 146.

The operation of interface unit 110 is further illustrated by the following discussion describing the steps of typical "selection" and "reselection" operations involving an interface unit 110 incorporated in a data port 106 of an array controller 108 of FIG. 3. Although various data transfer operations, message transfer operations and command transfer operations have been described in the above discussion of interface unit 110, the following provides particular illustrations of how interface unit 110 can be operated in accordance with the protocol illustrated by FIGS. 6–10. One skilled in the art will appreciate that interface unit 110 may be operated differently, and may implement a different protocol, and still operate in accordance with the principles of the present invention.

Figure 6:
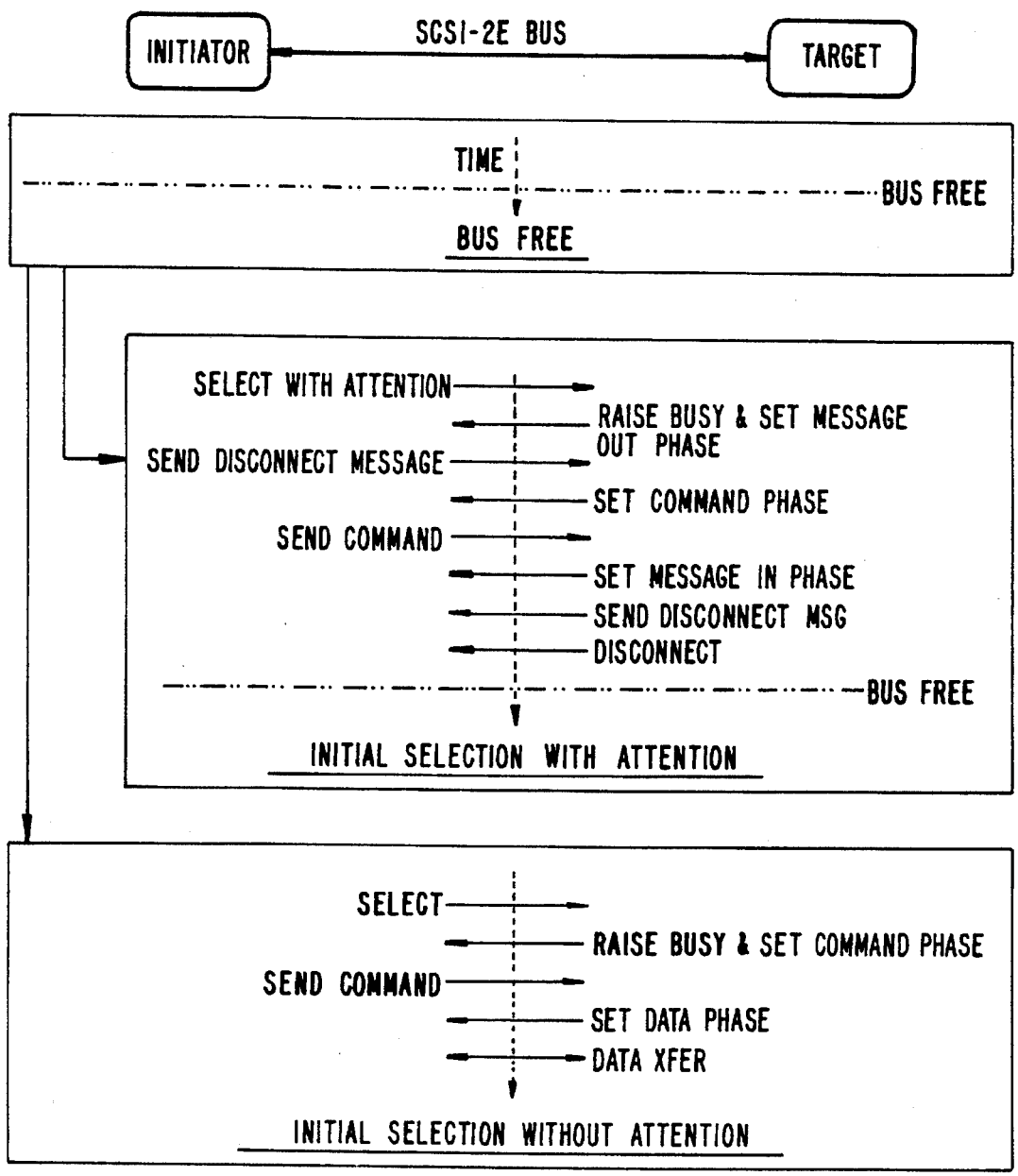
FIGS. 6–9 are flowchart diagrams illustrating the steps of various exemplary operations for transferring information over the SCSI-2E interface bus of the present invention.

Initial Selection (FIG. 6)

Microprocessor 150 of array controller 108 prepares interface unit 110 to receive commands from device controller 104 via SCSI-2E bus 102 as follows. The microprocessor sends an instruction signal, via LBE 120, to branch register 128 to stage an instruction for microsequencer 112. The microprocessor then sets the "GO" bit of control register 130, which causes microsequencer 112 to begin executing the instruction staged in register 128. Microsequencer 112 then tells SCSI chip 114 (via Data Out buffer 146 and bus 120) to wait for selection by device controller 104. Microsequencer 112 does this by putting the register address of command register 114*a* of SCSI chip 114 in register 136, setting the SCSI chip select bit of register 136, and setting a bit in command register 114*a* that tells the SCSI chip to look for a select control signal on bus 102*a*. Microsequencer may also initialize other registers in SCSI chip 114 at this time.

When device controller 104 selects SCSI chip 114 (using the "select" control line of bus 102*a*), SCSI chip 114 interrupts microsequencer 112, which analyzes the interrupt by reading interrupt status register 114*c*, and causes SCSI chip 114 to respond to the selection by requesting a message or command (depending on whether selection is with or without attention). Assuming a message is requested, SCSI chip 114 receives the first byte of a message word ("disconnect") and stores the word in its internal FIFO circuit. At the same time, the other three bytes of the message word are automatically stored in FIFO circuits 116*b–d*, respectively. SCSI chip 114 then interrupts microsequencer 112. Microsequencer 112 moves the first byte of the message word from SCSI chip 114 to FIFO circuit 116*a*. Once all bytes of the message words are stored in FIFO circuits 116*a–d*, and if a command is to follow, microsequencer 112 then loads the command register 114*a* of SCSI chip 114 with a request command instruction, and SCSI chip 114 requests a command by asserting appropriate control signals on bus 102*a*. When a command has been received, microsequencer 112 loads a status code in status register 134 and interrupts the microprocessor.

The microprocessor then reads status register 134 to determine what type of information is in FIFO circuits 116*a–d* (e.g., selection, error data, etc.). The microprocessor then reads the message/command from FIFO circuits 116*a–d*, and checks its validity. Microprocessor 150 loads a "disconnect" message into FIFO circuits 116*a–d*. The microprocessor instructs microsequencer 112 to disconnect by loading a corresponding instruction in branch register 128 and setting the "GO" bit in control register 130. Microsequencer 112 transfers the lowest byte of the "disconnect" message from FIFO circuit 116*a* to SCSI chip 114, and then instructs SCSI chip 114 to send the "disconnect" message to device controller 104. SCSI chip 114 and FIFO circuits 116*b–*116*d* send the "disconnect" message to device controller 104*a* and then interrupts microsequencer 112 to tell the microsequencer that it has so informed device controller 104.

Microsequencer 112 then loads the command register 114*a* of SCSI chip 114 with the disconnect instruction, and SCSI chip 114 disconnects. SCSI chip 114 again interrupts microsequencer 112, which, in turn, interrupts the microprocessor. At this point, the microprocessor has the information sent by device controller 104*a* and can perform the necessary steps without tying up device controller 104 or the SCSI-2E bus (because it is no longer connected). At the same time, it has instructed the microsequencer 112 to wait for another selection by device controller 104*a*. When the microprocessor has finished processing the command or information received from device controller 104, it will initiate "reselection" (discussed below).

Figure 7:
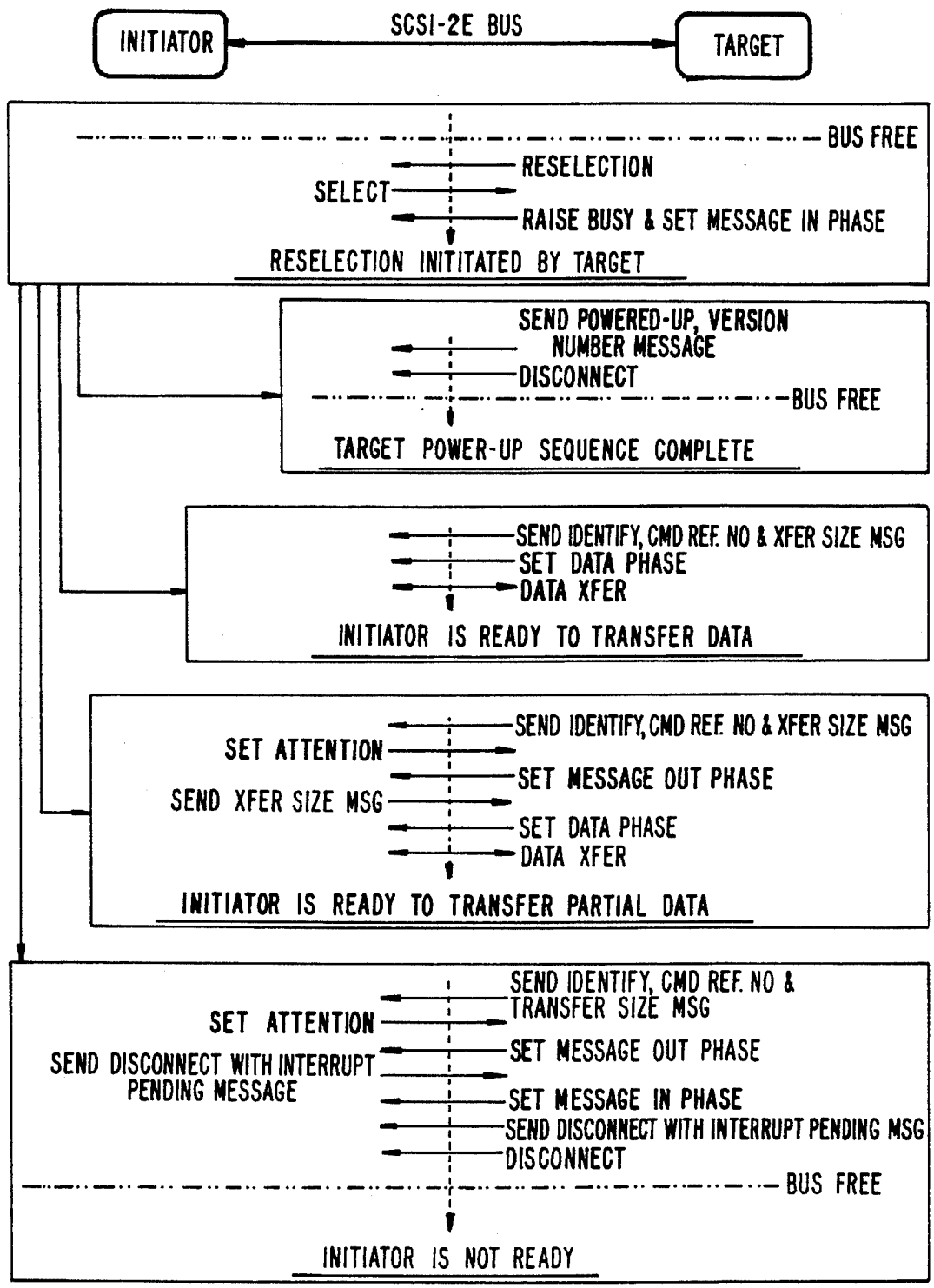
Figure 8:
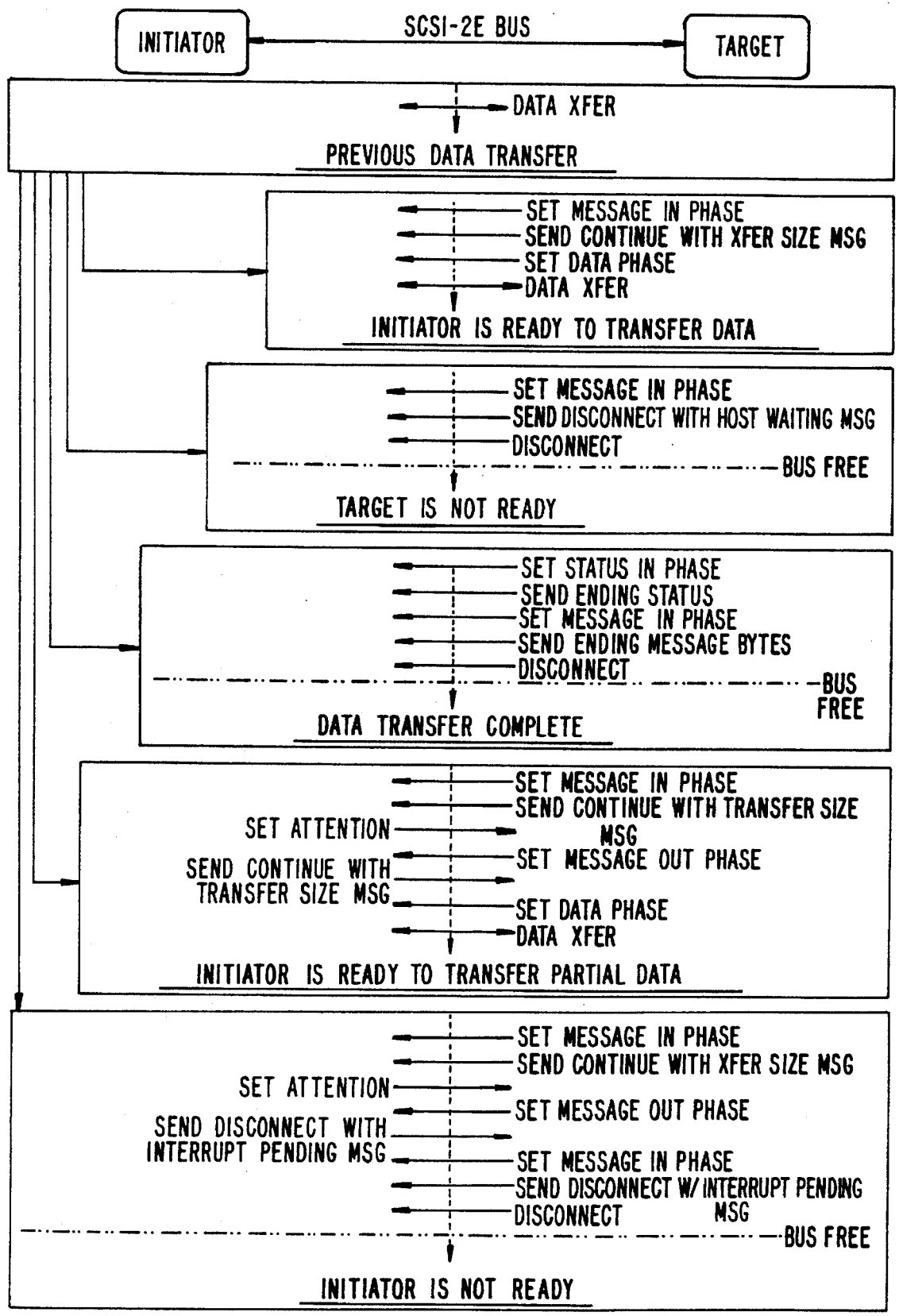
Figure 9:
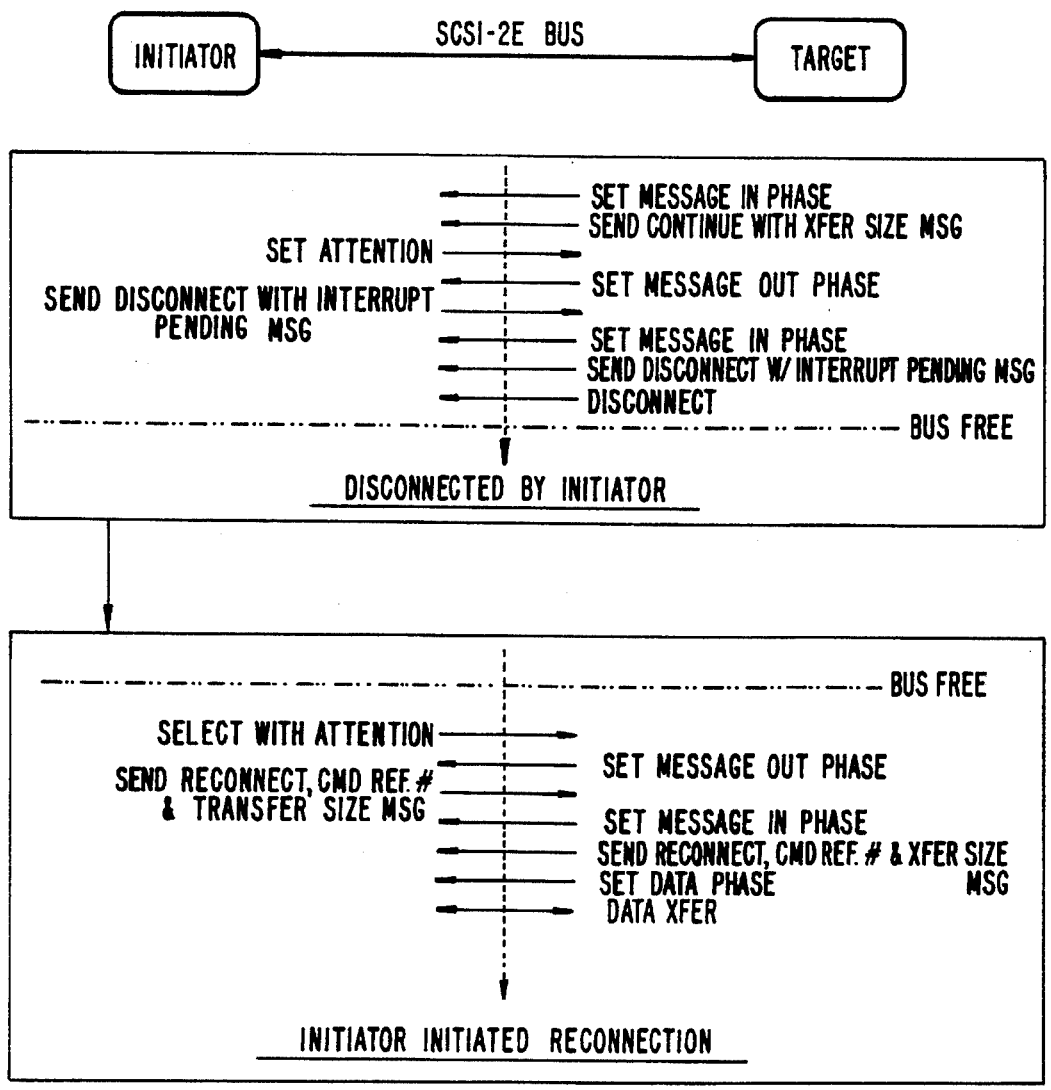
Figure 10:
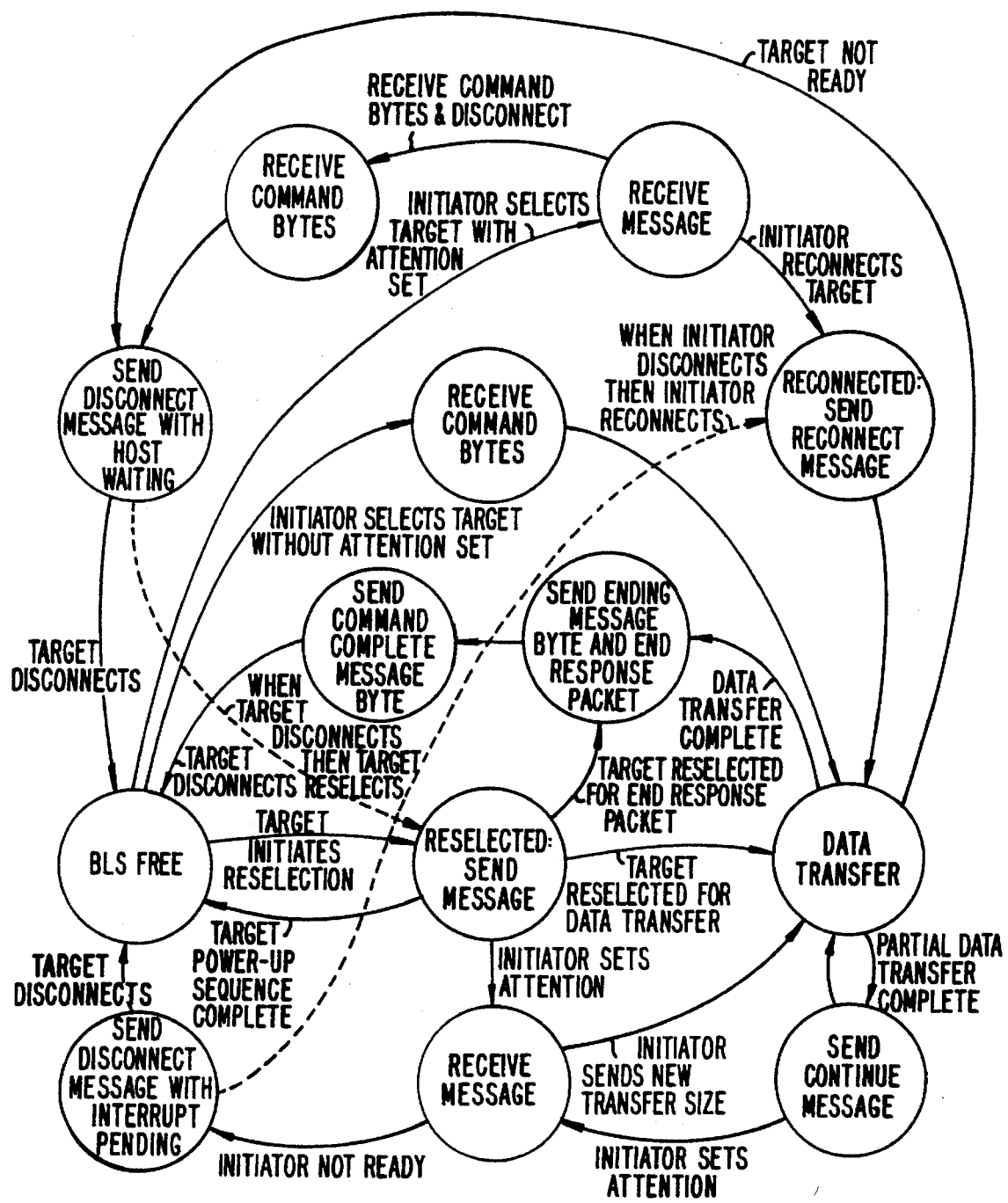
FIG. 10 is a state diagram of the SCSI-2E interface of the present invention.

Reselection (FIG. 7)

Assuming the microprocessor has performed any necessary operations (e.g., retrieve data from a storage device), it now loads a "reselect" message into FIFO circuits 116*a–d*, loads branch register 128 with the "reselect" instruction, and sets the "GO" bit in control register 130. Microsequencer 112 copies the first byte of data from FIFO circuit 116*a* to the internal FIFO circuit of SCSI chip 114, and instructs SCSI chip 114 to initiate reselection. When SCSI chip 114 detects that it has been reselected by device controller 104*a*, it signals microsequencer 112 (via a DReq signal on line 151) to initiate message transfer.

Thus it is seen that this invention provides a single bus interface cable capable of simultaneously transferring at least 32 bits of data, and an interface unit for interfacing the cable with a device. One skilled in the art will appreciate that the present invention can be practiced by other than the described embodiments, which are presented for purposes of illustration and not of limitation, and the present invention is limited only by the claims which follow.

Exemplary Program Listing For Microsequencer 112

```
"*+*"
"* (C) Copyright 1990, SF2 Corporation, All Rights Reserved *"
"* This program is an unpublished work fully protected by the
5   United States copyright laws and is considered a trade secret
    belonging to the copyright holder. *"
"*******************************************************"
    DEVICE (CPL154)
    DEFAULT - 1;
10  DEFINE
            Fail         - eq
"*******************************************************"
"       inputs                                           "
"*******************************************************"
15  "Control Register"

s_int        - t4        " -ve active "
            bl_dack      - t3        " -ve active "
            s_dreq       - t2
            ena_seq      - t1
20          seq_go       - t0

"Branch Control Register"

run_diag     - t7
            receive_data - t6
            send_data    - t5
25          receive_msg  - t4
            send_msg     - t3
            deselect     - t2
            init_res     - t1
            ena_sel      - t0

30  "This bits are valid only if the run_diag bit is set"
```

```
         test_06            - t5       " Xfer Data "
         test_05            - t4       " Xfer Data "
         test_04            - t3
         test_03            - t2
  5      test_02            - t1
         test_01            - t0

"****** SCSI Internal Registers ******"
    "Interrupt Status register"

bus_rst            - t7
 10      cmd_err            - t6
         discon             - t5
         bus_srv            - t4
         func_cmpl          - t3
         sel_attn           - t1
 15      selected           - t0 bus_srv_msk        - 08#h

"Status register"

gross_err          - t6
         parity_er          - t5

20 "********************************************************"
    "            outputs/controls                            "
    "********************************************************"

"selection/control bits"

wrt                - 8700#h
 25      wrt_sel            - 8000#h
         s_strb             - 4700#h
         s_strb_sel         - 4000#h
```

|   |            |           |                        |
|---|------------|-----------|------------------------|
|   | rd         | – 2700#h  |                        |
|   | rd_sel     | – 2000#h  |                        |
|   | f_strb     | – 1700#h  |                        |
|   | f_strb_sel | – 1000#h  |                        |
| 5 | int29k     | – 0800#h  | "29K-microprocessor 150" |
|   | sel_stat   | – 0300#h  | " -ve active "         |
|   | sel_r1     | – 0600#h  | " -ve active "         |
|   | sel_r2     | – 0500#h  | " -ve active "         |
|   | sel_none   | – 0700#h  | " -ve active "         |

10  "Select Register 1 (Upper Nibble)"

|    |             |          |                |
|----|-------------|----------|----------------|
| "  | wrtcnst     | – 40#h   | " -ve active " |
|    | init_r1     | – 40#h   |                |
|    | s_chp       | – c0#h   |                |
|    | s_chp_wrtc  | – 80#h   |                |
| 15 | e_fifo      | – 50#h   |                |
|    | e_fifo_wrtc | – 10#h   |                |

"Select Register 2"

|    |                |         |                |
|----|----------------|---------|----------------|
|    | fifo_rst       | – 80#h  |                |
|    | diag_bl        | – 10#h  |                |
| 20 | dis_bl         | – 0f#h  |                |
|    | init_r2        | – 0f#h  |                |
|    | sel_dt_in      | – 03#h  | " -ve active " |
|    | sel_cntl       | – 05#h  | " -ve active " |
|    | sel_brnch      | – 06#h  | " -ve active " |
| 25 | fifo_rst_dbl   | – 8f#h  |                |
|    | sel_dt_in_dbl  | – 0b#h  | " -ve active " |
|    | sel_cntl_dbl   | – 0d#h  | " -ve active " |
|    | sel_brnch_dbl  | – 0e#h  | " -ve active " |

"Status Register"

| | | |
|---|---|---|
| | t_seq_busy | - 01#h |
| | t_selected | - 02#h |
| | t_sel_cmd | - 03#h |
| 5 | t_sel_msg_cmd | - 04#h |
| | t_reselected | - 05#h |
| | t_resel_msg | - 06#h |
| | t_reconnected | - 07#h |
| | t_recon_msg | - 08#h |
| 10 | t_disc | - 09#h |
| | t_disc_msg | - 0a#h |
| | t_msg_sent | - 0b#h |
| | t_msg_rcvd | - 0c#h |
| | t_data_sent | - 0d#h |
| 15 | t_data_rcvd | - 0e#h |
| | t_sel_aborted | - 0f#h |
| | | |
| | t_inv_branch | - 10#h |
| | t_parity_err | - 11#h |
| | t_gross_err | - 12#h |
| 20 | t_inv_cmd_err | - 13#h |
| | t_bus_srv | - 14#h |
| | t_scsi_rst | - 15#h |
| | t_sel_err | - 16#h |
| | t_sel_msg_bsrv | - 17#h |
| 25 | t_sel_cmd_bsrv | - 18#h |
| | t_sel_inv_msg | - 19#h |
| | t_rec_msg_bsrv | - 1a#h |
| | t_time_out_err | - 1b#h |
| | t_inv_msg | - 1c#h |
| 30 | t_bsrv_on_msgi | - 1d#h |
| | t_bsrv_on_msgo | - 1e#h |
| | t_rdt_xfer_err | - 1f#h |

|  |  |  |
|---|---|---|
|  | t_wdt_xfer_err | - 20#h |
|  | t_sndmsg_msg | - 21#h |
|  | t_snddata_msg | - 22#h |
|  | t_rcvdata_msg | - 23#h |
| 5 | t_end_of_tst1 | - ff#h |
|  | t_end_of_tst2 | - 82#h |
|  | t_end_of_tst3 | - 83#h |
|  | t_end_of_tst4 | - 84#h |
|  | t_end_of_tst5 | - 85#h |
| 10 | t_end_of_tst6 | - 86#h |
|  | t_inv_test_no | - 90#h |
|  | t_tst4_err | - 91#h |

"***** SCSI Internal Registers *****"

"Select Register 1 (Lower Nibble)"

|  |  |  |
|---|---|---|
| 15 | s_xferlo | - 00#h |
|  | s_xferhi | - 01#h |
|  | s_fifo | - 02#h |
|  | s_cmdreg | - 03#h |
|  | s_status | - 04#h |
| 20 | s_res_bid | - 04#h |
|  | s_intreg | - 05#h |
|  | s_timeout | - 05#h |
|  | s_seqstep | - 06#h |
|  | s_fifoflg | - 07#h |
| 25 | s_config | - 08#h |
|  | s_clkcov | - 09#h |
|  | s_test | - 0a#h |

"Command/Message"

|  |  |  |
|---|---|---|
|  | dis_conct | - 27#h |

| | | | |
|---|---|---|---|
| | dis_sel | - 45#h | |
| | enasel | - 44#h | |
| | nop | - 00#h | |
| | rcv_msg | - 28#h | |
| 5 | rcvdmsg | - a8#h | |
| | rcv_cmd | - 29#h | |
| | rcvdcmd | - a9#h | |
| | rcv_data | - 2a#h | |
| | rcvddata | - aa#h | |
| 10 | res_seq | - 40#h | |
| | rst_chp | - 02#h | |
| | snd_data | - 22#h | |
| | snddata | - a2#h | |
| | snd_msg | - 20#h | |
| 15 | snddmsg | - a0#h | |
| | termseq | - 24#h | |
| | | | |
| | cmd_cnt_hi | - 00#h | |
| | cmd_cnt_lo | - 1a#h | " 104 Bytes " |
| | data_count | - 50 | " 200 Bytes/Words " |
| 20 | discmsg | - 03#h | |
| | flush_fifo | - 01#h | |
| | init_id | - 07#h | |
| | tgt_mode | - 05#h | |
| | timeout | - 95#h | |

25 "General Defines"

| | | |
|---|---|---|
| | off | - 0700#h |
| | init_regs | - 0000#h |
| | init_data | - 45#h |
| | | |
| | zero | - 00#h |
| 30 | one | - 01#h |
| | two | - 02#h |

```
          three                - 03#h
          four                 - 04#h;

BEGIN

"*******************************************************"
5    "Wait for Seq_Go bit & then decode Branch Register "
     "*******************************************************"

start:  sel_r1 + init_r1,                     continue;
             sel_r2 + sel_cntl,                    continue;
             off,                                  continue;
10   start2: off,              if (not seq_go) then goto pl(start2);
             sel_r2 + sel_brnch_dbl,               continue;
             off,                                  continue;
             off,              if (run_diag) then goto pl (test);
             off,              if (ena_sel) then goto pl (w4_sel);
15           off,              if (init_res) then goto pl (resel);
             off,              if (deselect) then goto pl (disc);
             off,              if (send_msg) then goto pl (sndmsg);
             off,              if (receive_msg) then goto pl (rcvmsg);
             off,              if (send_data) then goto pl (snddt);
20           off,              if (receive_data) then goto pl (rcvdt);
             sel_stat + t_inv_branch + int29k,  if (not fail) then goto
                                                  pl (start);

"***********************************************************"
     "       Wait for Selection
25   "***********************************************************"

w4_sel: sel_r1 + s_chp_wrtc + s_cmdreg,       continue;
             wrt + enasel,                         continue;
             sel_none + enasel,                    continue;
             sel_r1 + init_r1, if (not fail) then call pl (w4_int);
```

```
sel1: off,              if (sel_attn) then goto pl (attnst);
      off,              if (selected) then goto pl (noattn);
      off,              if (func_cmpl) then goto pl (no_sel);
      sel_stat + t_sel_err + int29k,    if (not fail) then goto
                                            pl (start);

no_sel:sel_stat + t_sel_aborted + int29k, if (not fail) then goto
                                            pl (start);

noattn:sel_r2 + fifo_rst + sel_dt_in_dbl, continue;
      sel_r2 + sel_dt_in_dbl,   if (not fail) then call pl
                                            (dmpidm);
      off,              if (not fail) then call pl (dmpidm);
      off,              if (not fail) then call pl (rcvcmd);
      off,              if (bus_srv) then goto pl (err_00);
      sel_stat + t_sel_cmd + int29k,    if (not fail) then goto
                                            pl (start);

err_00: sel_stat + t_sel_cmd_bsrv + int29k,   if (not fail) then
                                            go to pl (start);

attnst: sel_r2 + sel_dt_in_dbl,   if (not fail) then call pl
                                            (dmpidm);
      off,              if (not fail) then call pl (xfr_rd);
      off,              cmp tm (ff#h) to pl (01#h);
      off,              if (eq) then goto pl (attnl);
      off,              if (not eq) then goto pl (recon);

attnl: off,             if (not fail) then call pl (rcvcmd);
      sel_stat + t_sel_msg_cmd + int29k,   if (not fail) then goto
                                            pl (start);

err_02:sel_stat + t_sel_msg_bsrv + int29k,    if (not fail) then
                                            goto pl (start);
```

```
recon:  off,                    cmp tm (3f#h) to pl (33#h);
        off,                    if (eq) then goto pl (recon1);
        off,                    if (not eq) then goto pl (err_04);

recon1: off,                    if (not fail) then call pl (rcvmg);
        off,                    if (bus_srv) then goto pl (err_06);
        sel_stat + t_recon_msg + int29k,   if (not fail) then goto
                                           pl (start);

err_04: sel_stat + t_sel_inv_msg + int29k,    if (not fail) then
                                              goto pl (start);

err_06: sel_stat + t_rec_msg_bsrv + int29k,   if (not fail)
"*********************************************************"
"Initiate Reselection"
"*********************************************************"

resel:  sel_stat + t_seq_busy,              continue;
        sel_rl + s_chp_wrtc + s_timeout,    continue;
        wrt + timeout,                      continue;
        sel_none + timeout,                 continue;
        sel_rl + init_rl,                   continue;

sel_rl + s_chp_wrtc + s_res_bid,    continue;
        wrt + init_id,                      continue;
        sel_none + init_id,                 continue;
        sel_rl + init_rl,                   continue;

sel_rl + s_chp + s_fifo + e_fifo,   continue;
        wrt,                                continue;
        sel_rl + init_rl + wrt_sel,         continue;

resel1: sel_rl + s_chp_wrtc + s_cmdreg,     continue;
        wrt + res_seq,                      continue;
        sel_none + res_seq,                 continue;
```

```
         sel_rl + init_rl,                   continue;

off,            if (not fail) then call pl (w4int);
         off,            if (func_cmpl) then goto pl (resel2);
         off,            if (discon) then goto pl (err_08);
5        off,            if (not fail) then goto pl (sel1);

err_08:sel_stat + t_time_out_err + int29k,  if (not fail) then
       goto pl (start);

resel2:sel_rl + e_fifo,                  continue;
            wrt + f_strb,                     continue;
10          sel_rl + s_chp_wrtc + s_xferhi,   continue;
            wrt + 00#h,                       continue;
            sel_none + 00#h,                  continue;
            sel_rl + init_rl,                 continue;
            sel_rl + s_chp_wrtc + s_xferlo,   continue;
15          wrt + 03#h,                       continue;
            sel_none + 03#h,  if (not fail) then load pl (03#h);
            sel_rl + init_rl, if (not fail) then call pl (sdmsg1);
            off,              if (not bus_srv) then goto pl (resel4);
            off,              if (not fail) then call pl (rcvmg1);
20          off,              while (creg <> 0) loop to pl (rcvmor);
            sel_stat + t_resel_msg + int29k,  if (not fail) then goto
                                              pl (start);

rcvmor:off,              if (not fail) then call pl (rcvmg);
            sel_stat + t_resel_msg + int29k,  if (not fail) then goto
25                                            pl (start);

resel4:sel_stat + t_reselected + int29k, if (not fail) then goto
                                              pl (start);

"******************************************************************"
"    Send Message to PAA"
```

NOTE: Message should be loaded in the External FIFO"

"*********************************************************"

```
sndmsg:sel_stat + t_seq_busy,   if (not fail) then call pl (sdmsg);
       off,                     if (not bus_srv) then goto pl
                                (mgxfrd);
       off,                     if (not fail) then call pl (rcvmgl);
       off,                     while (creg <> 0) loop to pl
                                (sndmgl);
       sel_stat + t_sndmsg_msg + int29k,   if (not fail) then goto
                                pl (start);

sndmgl:off,                     if (not fail) then call pl (rcvmg);
       sel_stat + t_sndmsg_msg + int29k,   if (not fail) then goto
                                pl (start);

mgxfrd:sel_stat + t_msg_sent + int29k,   if (not fail) then goto
                                pl (start);
```

"*********************************************************"
"    Get Message from PAA"
"*********************************************************"

```
rcvmsg:sel_stat + t_seq_busy,   if (not fail) then call pl
                                (rcvmgl);
       off,                     while (creg <> 0) loop to pl
                                (rcv_mg);
       sel_stat + t_msg_rcvd + int29k,   if (not fail) then goto
                                pl (start);

rcv_mg:off,                     if (not fail) then call pl (rcvmg);
       sel_stat + t_msg_rcvd + int29k,   if (not fail) then goto
                                pl (start);
```

"*********************************************************"

```
"       Send Data to PAA"
"       NOTE:  Transfer Counters in the SCSI Chips should be set"
"***********************************************************"

snddt:  sel_rl + s_chp_wrtc + s_cmdreg,    continue;
 5          wrt + snddata,                      continue;
            sel_none + snddata,     if (not fail) then load pl
                                                  (data_count);
            sel_rl + init_rl,  if (not fail) then call pl (dma_wt);
            off,               if (not bus_srv) then goto pl (snddt2);
10          off,               if (not fail) then call pl (rcvmgl);
            off,               while (creg <> 0) loop to pl (snddt1);
            sel_stat + t_snddata_msg + int29k,  if (not fail) then goto
                                                   pl (start);

snddt1:off,                if (not fail) then call pl (rcvmg);
15          sel_stat + t_snddata_msg + int29k,  if (not fail) then goto
                                                   pl (start);

snddt2:sel_stat + t_data_sent + int29k,     if (not fail) then goto
                                                   pl (start);

"***********************************************************"
20 "       Receive Data to PAA"
 "       NOTE:  Transfer Counters in the SCSI Chips should be set"
"***********************************************************"

rcvdt:  sel_rl + s_chp_wrtc + s_cmdreg,    continue;
            wrt + rcvddata,                     continue;
25          sel_none + rcvddata,    if (not fail) then load pl
                                                  (data_count);
            sel_rl + init_rl,  if (not fail) then call pl (dma_rd);
            off,               if (not bus_srv) then goto pl (rcvdt2);
            off,               if (not fail) then call pl (rcvmgl);
30          off,               while (creg <> 0) loop to pl (rcvdt1);
```

```
              sel_stat + t_rcvdata_msg + int29k,   if (not fail) then goto
                                                  pl (start);

rcvdt1:off,                                 if (not fail) then call
                                                  pl (rcvmg);

5             sel_stat + t_rcvdata_msg + int29k,   if (not fail) then goto
                                                  pl (start);

rcvdt2:sel_stat + t_data_rcvd + int29k,    if (not fail) then goto
                                                  pl (start);

"*********************************************************"
10     "    Send Disconnect Message and then Disconnect"
       "NOTE: Disconnect Message should be loaded in the External FIFO"
       "*********************************************************"

disc:  sel_stat + t_seq_busy,              if (not fail) then load pl
                                                  (01#h);

15            off,                                if (not fail) then call pl
       (xfr_wt);
              sel_rl + s_chp_wrtc + s_cmdreg,     continue;
              wrt + snd_msg,                      continue;
              sel_none + snd_msg,                 continue;
20            sel_rl + init_rl,                   if (not fail) then call pl (w4int);
              off,                                if (not bus_srv) then goto pl
                                                  (disc1);
              off,                                if (not fail) then call pl (rcvmg1);
              off,                                while (creg <> 0) loop to pl rcvmr);
25            sel_stat + t_disc_msg + int29k,    if (not fail) then goto pl
                                                  (start);

rcvmr: off,            if (not fail) then call pl (rcvmg);
              sel_stat + t_disc_msg + int29k, if (not fail) then goto pl
                                                  (start);
```

```
     disc1: sel_rl + s_chp_wrtc + s_cmdreg,      continue;
            wrt + dis_conct,                     continue;
            sel_none + dis_conct,                continue;
            sel_rl + init_rl,                    continue;
 5          sel_stat + t_disc + int29k,          if (not fail) then goto p1
                                                 (start);

"*********************************************************"
"     Interrupt Handling Routine"
"*********************************************************"

10   w4_int:sel_r2 + sel_cntl_dbl,               continue;
            off,                                 continue;
     no_int:off,             if (not s_int) then goto p1 (int);
            sel_r2 + sel_brnch_dbl,              continue;
            off,                                 continue;
15          off,              if (ena_sel) then goto p1 (w4_int);

"*********************************************************"
"     If Enable Selection Bit is Off then Disable Selection"
"*********************************************************"

sel_rl + s_chp_wrtc + s_cmdreg,      continue;
20          wrt + dis_sel,                       continue;
            sel_none + dis_sel,                  continue;
            sel_rl + init_rl,                    continue;

w4int: sel_r2 + sel_cntl_dbl,               continue;
            off,                                 continue;
25   noint: off,              if (s_int) then goto p1 (noint);

int:   sel_stat + t_seq_busy,               continue;

onechp:sel_rl + s_chp + s_status,           continue;
            off,                                 continue;
```

```
        rd,                              continue;
        sel_r2 + init_r2 + rd_sel,       continue;
        sel_r2 + sel_dt_in_dbl + rd_sel, continue;
        rd,                              continue;
        rd,              if (parity_er) then goto pl (err_10);
        off,             if (gross_err) then goto pl (err_12);
        sel_r1 + init_r1,                continue;
        sel_r1 + s_chp + s_intreg,       continue;
        off,                             continue;
        rd,                              continue;
        sel_r2 + init_r2 + rd_sel,       continue;
        sel_r2 + sel_dt_in_dbl + rd_sel, continue;
        rd,                              continue;
        rd,              if (cmd_err) then goto pl (err_14);
        off,             if (bus_rst) then goto pl (err_16);
        sel_r1 + init_r1, if (not fail) then ret;

err_10:sel_stat + t_parity_err + int29k,  if (not fail) then goto
                                             pl (start);

err_12:sel_stat + t_gross_err + int29k,   if (not fail) then goto
                                             pl (start);

err_14:sel_stat + t_inv_cmd_err + int29k, if (not fail) then goto
                                             pl (start);

err_16:sel_stat + t_scsi_rst + int29k,    if (not fail) then goto
                                             pl (start);

"*************************************************************"
"     Receive Command Bytes                                   "
"*************************************************************"
   rcvcmd:sel_r1 + s_chp_wrtc + s_xferhi,    continue;
          wrt + cmd_cnt_hi,                  continue;
          sel_none + cmd_cnt_hi,             continue;
```

```
       sel_r1 + init_r1,                        continue;

sel_r1 + s_chp_wrtc + s_xferlo,          continue;
       wrt + cmd_cnt_lo,                        continue;
       sel_none + cmd_cnt_lo,                   continue;
 5     sel_r1 + init_r1,                        continue;

sel_r1 + s_chp_wrtc + s_cmdreg,          continue;
       wrt + rcvdcmd,                           continue;
       sel_none + rcvdcmd,  if (not fail) then load pl
                            (cmd_cnt_lo);
10     sel_r1 + init_r1,   if (not fail) then call pl (dma_rd);
       off,                if (not fail) then ret;

"*************************************************************"
       "Dump Initiator ID or Dummy Message byte"
"*************************************************************"

15 dmpidm:sel_r1 + s_chp + s_fifo,              continue;
       off,                                     continue;
       rd,                                      continue;
       rd,                                      continue;
       sel_r1 + init_r1,     if (not fail) then ret;

20 "*************************************************************"
       "   Receive 1st Message Byte"
"*************************************************************"

rcvmg1:sel_r2 + fifo_rst_dbl,                continue;
       sel_r2 + dis_bl,                         continue;
25     sel_r1 + s_chp_wrtc + s_cmdreg,          continue;
       wrt + rcv_msg,                           continue;
       sel_none + rcv_msg,                      continue;
       sel_r1 + init_r1, if (not fail) then call pl (w4int);
```

```
             off,           if (not fail) then load pl (0);

"if Bus Service is requested then load CREG with a non zero value"

off,           if (bus_srv) then load pl (1);

xfr_rd:sel_r1 + s_chp + s_fifo + e_fifo,   continue;
5        off,                                   continue;
         rd,                                    continue;
         rd,                                    continue;
         sel_r2 + init_r2 + rd_sel + f_strb_sel,   continue;
         sel_r2 + sel_dt_in_dbl + rd_sel,      continue;
10       sel_r1 + init_r1 + rd_sel,    if (not fail) then ret;

"****************************************************************
     "
     "          Receive Message Bytes"
     "****************************************************************
15   "

rcvmg: off,        cmp tm (f0#h) to pl (00#h);
              off,          if (eq) then goto pl (nomore);
              off,          if (not eq) then goto pl (more);
         nomore:off,        if (not fail) then ret;

20       more: off,         if (t7) then goto pl (err_18);
              off,          if (t6) then goto pl (err_18);
              off,          if (t5) then goto pl (twomsg);

onemsg:sel_r1 + s_chp_wrtc + s_xferlo,   continue;
              wrt + 01#h,   if (not fail) then load pl (01#h);
25       sel_none + 01#h,   if (not fail) then goto pl (getmsg);

twomsg:off,        if (t4) then goto pl (threem);
              sel_r1 + s_chp_wrtc + s_xferlo,    continue;
```

```
        wrt + 02#h,         if (not fail) then load pl (02#h);
        sel_none + 02#h,    if (not fail) then goto pl (getmsg);

threem:sel_rl + s_chp_wrtc + s_xferlo,    continue;
        wrt + 03#h,         if (not fail) then load pl (03#h);
5       sel_none + 03#h,                     continue;

getmsg:sel_rl + init_rl,                  continue;
        sel_rl + s_chp_wrtc + s_xferhi,      continue;
        wrt + 00#h,                          continue;
        sel_none + 00#h,                     continue;
10      sel_rl + init_rl,                    continue;
        sel_rl + s_chp_wrtc + s_cmdreg,      continue;
        wrt + rcvdmsg,                       continue;
        sel_none + rcvdmsg,                  continue;
        sel_rl + init_rl,   if (not fail) then goto pl (dma_rd);

15 err_18:sel_stat + t_inv_msg + int29k,    if (not fail) then goto
                                             pl (start);

"************************************************************"
   "    Send Message Bytes"
   "    NOTE: Load External FIFO with Message Words"
20 "************************************************************"

sdmsg: sel_rl + e_fifo + wrt_sel,         continue;
        sel_r2 + init_r2 + wrt_sel,          continue;
        sel_r2 + sel_dt_in_dbl + wrt_sel,    continue;

wrt,                                 continue;
25      wrt,                if (t7) then goto pl (err_18);
        off,                if (t6) then goto pl (err_18);
        off,                if (t5) then goto pl (msg_10);

msg_00:off,              if (t4) then goto pl (msg_01);
```

```
            sel_rl + s_chp_wrtc + s_xferlo,      continue;
            wrt + 01#h,         if (not fail) then load pl (01#h);
            sel_none + 01#h,    if (not fail) then goto pl (xfrmsg);

msg_01: sel_rl + s_chp_wrtc + s_xferlo,      continue;
            wrt + 02#h,         if (not fail) then load pl (02#h);
            sel_none + 02#h,    if (not fail) then goto pl (xfrmsg);

msg_10: off,                if (t4) then goto pl (msg_11);
            sel_rl + s_chp_wrtc + s_xferlo,      continue;
            wrt + 03#h,         if (not fail) then load pl (03#h);
            sel_none + 03#h,    if (not fail) then goto pl (xfrmsg);

msg_11: sel_rl + s_chp_wrtc + s_xferlo,      continue;
            wrt + 04#h,         if (not fail) then load pl (04#h);
            sel_none + 04#h,                     continue;

xfrmsg: sel_rl + init_rl,                    continue;
            sel_rl + s_chp_wrtc + s_xferhi,      continue;
            wrt + 00#h,                          continue;
            sel_none + 00#h,                     continue;
            sel_rl + init_rl,                    continue;

sdmsg1: sel_rl + s_chp_wrtc + s_cmdreg,      continue;
            wrt + snddmsg,                       continue;
            sel_none + snddmsg,                  continue;
            sel_rl + init_rl,   if (not fail) then call pl (dma_wt);
            off,                if (not fail) then ret;

"*************************************************************"
    " Transfer Bytes from the SCSI Chip to the FIFO in DMA mode   "
    "          Note:  Load CREG before calling this routine       "
    "*************************************************************"

dma_rd: sel_rl + e_fifo,                     continue;
```

```
          sel_r2 + sel_cntl_dbl,          continue;
          rd,                             continue;
   dmard: rd,                    if (s_int) then goto pl (chkdma);
          off,                   if (not fail) then call pl (onechp);
5         off,                   if (not fail) then ret;

chkdma:rd,                    if (not s_dreq) then goto pl (dmard);
          rd,                    while (creg <> 0) loop to pl (dack);
          sel_stat + t_rdt_xfer_err + int29k, if (not fail) then
                                    goto pl (start);

10 dack:  rd + s_strb,                    continue;
          rd + s_strb,                    continue;
          rd + s_strb + f_strb,           continue;
          rd,                    if (not fail) then goto pl (dmard);

"*********************************************************"
15 " Transfer Bytes from the FIFO to the SCSI Chip in DMA mode  "
   "      Note: Load CREG before calling this routine           "
   "*********************************************************"

dma_wt:sel_r1 + e_fifo,                continue;
          sel_r2 + sel_cntl_dbl,          continue;
20        wrt,                            continue;
   dmawrt:wrt,                   if (s_int) then goto pl (ckdma1);
          off,                   if (not fail) then call pl (onechp);
          off,                   if (not fail) then ret;

ckdma1:wrt,                   if (not s_dreq) then goto pl (dmawrt);
25        wrt,                   while (creg <> 0) loop to pl (dack1);
          sel_stat + t_wdt_xfer_err + int29k, if (not fail) then goto
                                    pl (start);

dack1: wrt + s_strb,                   continue;
          wrt + s_strb,                   continue;
```

```
        wrt,                   continue;
        wrt + f_strb,    if (not fail) then goto pl (dmawrt);

"*********************************************************
"
"      Transfer Bytes from the External FIFO to the SCSI Chip in"
"NON-DMA mode"
"*********************************************************
"

xfr_wt:sel_rl + s_chp + s_fifo + e_fifo,  while (creg <> 0) loop
                                          to pl (xferwt);
        sel_rl + init_rl, if (not fail) then ret;

xferwt:wrt,                    continue;
        sel_rl + e_fifo,       continue;
        wrt + f_strb,    if (not fail) then goto pl (xfr_wt);

"*********************************************************
"
"      Run Sequencer Diagnostics
"
"*********************************************************
"

"-----------------------------------------------------------
"
"***   Test 1: Set all status Bits                       ***"
"-----------------------------------------------------------
"

test: off,       if (test_01) then goto pl (test1);
              off,       if (test_02) then goto pl (test2);
              off,       if (test_03) then goto pl (test3);
              off,       if (test_04) then goto pl (test4);
```

```
         off,           if (test_05) then goto pl (test5);
         off,           if (test_06) then goto pl (test6);
         sel_stat + t_inv_test_no + int29k,  if (not fail) then goto
                                             pl (start);

5  test1: sel_r2 + sel_cntl_dbl,           continue;
         sel_stat + t_end_of_tst1 + int29k,  if (not fail) then goto
                                             pl (start);

"--------------------------------------------------------------
    "

10  "*** Test 2: Read External FIFO and write Data to the Status"
    "Register   ***"
    "*** NOTE: Write a Data Pattern in the External FIFO ***"
    "--------------------------------------------------------------
    "

15  test2: sel_r1 + e_fifo + wrt_sel,       continue;
         sel_r2 + init_r2 + wrt_sel,        continue;
         sel_r2 + sel_dt_in_dbl + wrt_sel,  continue;

wrt,                               continue;
         wrt,           if (t3) then goto pl (grt_8);
20       off,           if (t2) then goto pl (grt_4);
         off,           if (t1) then goto pl (grt_2);
         off,           if (t0) then goto pl (out_1);
         sel_stat + 00#h + int29k,   if (not fail) then goto pl
                                     (test2e);

25  out_1: sel_stat + 01#h + int29k,   if (not fail) then goto pl
                                       (test2e);

grt_4: off,          if (t1) then goto pl (grt_6);
         off,            if (t0) then goto pl (out_5);
```

```
         sel_stat + 04#h + int29k,      if (not fail) then goto pl
                                        (test2e);

out_5: sel_stat + 05#h + int29k,     if (not fail) then goto pl
                                        (test2e);

5 grt_6: off,                 if (t0) then goto pl (out_7);
         sel_stat + 06#h + int29k,      if (not fail) then goto pl
                                        (test2e);

out_7: sel_stat + 07#h + int29k,     if (not fail) then goto pl
                                        (test2e);

10 grt_2: off,                 if (t0) then goto pl (out_3);
         sel_stat + 02#h + int29k,      if (not fail) then goto pl
                                        (test2e);

out_3: sel_stat + 03#h + int29k,     if (not fail) then goto pl
                                        (test2e);

15 grt_8: off,                 if (t2) then goto pl (grt_c);
          off,                 if (t1) then goto pl (grt_a);
          off,                 if (t0) then goto pl (out_9);
         sel_stat + 08#h + int29k,      if (not fail) then goto pl
                                        (test2e);

20 out_9: sel_stat + 09#h + int29k,     if (not fail) then goto pl
                                        (test2e);

grt_c: off,                 if (t1) then goto pl (grt_e);
          off,                 if (t0) then goto pl (out_d);
         sel_stat + 0c#h + int29k,      if (not fail) then goto pl
25                                      (test2e);
```

```
out_d: sel_stat + 0d#h + int29k,    if (not fail) then goto pl
                                    (test2e);

grt_a: off,                if (t0) then goto pl (out_b);
       sel_stat + 0a#h + int29k,    if (not fail) then goto pl
                                    (test2e);

out_b: sel_stat + 0b#h + int29k,    if (not fail) then goto pl
                                    (test2e);

grt_e: off,                if (t0) then goto pl (out_f);
       sel_stat + 0e#h + int29k,    if (not fail) then goto pl
                                    (test2e);

out_f: sel_stat + 0f#h + int29k,    if (not fail) then goto pl
                                    (test2e);

test2e: off,               if (not fail) then goto pl (start);

"----------------------------------------------------"
"
"*** Test 3: Write Data to SCSI FIFO and then transfer it to"
"***    External FIFO
***"
"----------------------------------------------------"
"

"    Reset Chip FIFO first"

test3: sel_r1 + s_chp_wrtc + s_cmdreg,    continue;
       wrt + flush_fifo,                  continue;
       sel_none + flush_fifo,             continue;
       sel_none + flush_fifo,             continue;
       wrt + nop,                         continue;
       sel_none + nop,                    continue;
```

" Write Data into Chip FIFO"

```
            sel_rl + s_chp_wrtc + s_fifo,      continue;
            wrt + 00#h,                        continue;
            sel_none + 00#h,                   continue;
 5          sel_none + 00#h,                   continue;

wrt + 01#h,                        continue;
            sel_none + 01#h,                   continue;
            sel_none + 01#h,                   continue;

wrt + 02#h,                        continue;
10          sel_none + 02#h,                   continue;
            sel_none + 02#h,                   continue;

wrt + 03#h,                        continue;
            sel_none + 03#h,                   continue;
            sel_none + 03#h,                   continue;

15          wrt + 04#h,                        continue;
            sel_none + 04#h,                   continue;
            sel_none + 04#h,                   continue;

wrt + 05#h,                        continue;
            sel_none + 05#h,                   continue;
20          sel_none + 05#h,                   continue;

wrt + 06#h,                        continue;
            sel_none + 06#h,                   continue;
            sel_none + 06#h,                   continue;

wrt + 07#h,                        continue;
25          sel_none + 07#h,                   continue;
            sel_none + 07#h,                   continue;
```

|    |                      |                                        |
|----|----------------------|----------------------------------------|
|    | wrt + 08#h,          | continue;                              |
|    | sel_none + 08#h,     | continue;                              |
|    | sel_none + 08#h,     | continue;                              |
|    |                      |                                        |
|    | wrt + 09#h,          | continue;                              |
| 5  | sel_none + 09#h,     | continue;                              |
|    | sel_none + 09#h,     | continue;                              |
|    |                      |                                        |
|    | wrt + 0a#h,          | continue;                              |
|    | sel_none + 0a#h,     | continue;                              |
|    | sel_none + 0a#h,     | continue;                              |
|    |                      |                                        |
| 10 | wrt + 0b#h,          | continue;                              |
|    | sel_none + 0b#h,     | continue;                              |
|    | sel_none + 0b#h,     | continue;                              |
|    |                      |                                        |
|    | wrt + 0c#h,          | continue;                              |
|    | sel_none + 0c#h,     | continue;                              |
| 15 | sel_none + 0c#h,     | continue;                              |
|    |                      |                                        |
|    | wrt + 0d#h,          | continue;                              |
|    | sel_none + 0d#h,     | continue;                              |
|    | sel_none + 0d#h,     | continue;                              |
|    |                      |                                        |
|    | wrt + 0e#h,          | continue;                              |
| 20 | sel_none + 0e#h,     | continue;                              |
|    | sel_none + 0e#h,     | continue;                              |
|    |                      |                                        |
|    | wrt + 0f#h,          | continue;                              |
|    | sel_none + 0f#h,     | continue;                              |
|    | sel_none + 0f#h,     | if (not fail) then load pl (10#h);     |
| 25 | sel_rl + init_rl,    | continue;                              |

" Reset External FIFO"

```
            sel_r2 + fifo_rst_dbl,            continue;
            sel_r2 + dis_bl,                  continue;

"     Now Transfer Data from Chip FIFO to External FIFO"

rd_nxt: sel_r1 + s_chp + s_fifo + e_fifo, while (creg <> 0) loop
5                                               to pl (rd_ntl);
            sel_r1 + init_r1, if (not fail) then goto pl (test3e);

rd_ntl:off,                               continue;
            rd,                                continue;
            rd,                                continue;
10          rd + f_strb,      if (not fail) then goto pl (rd_nxt);

test3e:sel_stat + t_end_of_tst3 + int29k, if (not fail) then goto
                                                 pl (start);

"----------------------------------------------------------------"
     "*** Test 4:  Transfer Data from External FIFO to SCSI FIFO with"
15   "DMA    ***"
     "     Don't disable Buffer since 29K has to check the External"
     "FIFO"
     "----------------------------------------------------------------"
     test4: sel_r2 + sel_cntl_dbl, continue;    " Disable Buffer xfer "
20          sel_r1 + s_chp_wrtc + s_test,      continue;
            wrt + tgt_mode,                    continue;
            sel_none + tgt_mode,               continue;
            sel_r1 + init_r1,                  continue;

sel_r1 + s_chp_wrtc + s_xferhi,    continue;
25          wrt + 00#h,                        continue;
            sel_none + 00#h,                   continue;
            sel_r1 + init_r1,                  continue;
```

```
         sel_rl + s_chp_wrtc + s_xferlo,      continue;
         wrt + 11#h,                          continue;
         sel_none + 11#h,   if (not fail) then load pl (10#h);
         sel_rl + init_rl,                    continue;

5        sel_rl + s_chp_wrtc + s_cmdreg,      continue;
         wrt + snddata,                       continue;
         sel_none + snddata,                  continue;

sel_rl + e_fifo,        continue;   " Deselect Chip "
         sel_r2 + sel_cntl_dbl,               continue;

10  d_req: wrt,            if (not s_dreq) then goto pl (d_req);
         wrt,               while (creg <> 0) loop to pl (d_ack);
         off,               if (not fail) then load pl (10#h);
         off,               if (not fail) then goto pl (d_reql);

d_ack: wrt + s_strb,                     continue;
15         wrt + f_strb,   if (not fail) then goto pl (d_req);

d_reql:wrt,            if (not s_dreq) then goto pl (test42);
         sel_rl + s_chp_wrtc + s_cmdreg,      continue;
         wrt + rst_chp,                       continue;
         sel_none + rst_chp,                  continue;
20       sel_none + rst_chp,                  continue;
         wrt + nop,                           continue;
         sel_none + nop,                      continue;
         sel_stat + t_tst4_err + int29k,     if (not fail) then goto
                                              pl (start);

25  test42: wrt,           while (creg <> 0) loop to pl (d_reql);
         sel_rl + s_chp_wrtc + s_cmdreg,      continue;
         wrt + rst_chp,                       continue;
         sel_none + rst_chp,                  continue;
         sel_none + rst_chp,                  continue;
```

```
            wrt + nop,                      continue;

sel_none + nop,                 continue;

sel_stat + t_end_of_tst4 + int29k,  if (not fail) then goto
                                                pl (start);

5   "----------------------------------------------------------------"
    "***  Test 5:  Transfer Data between External FIFO & Buffer with"
    "DMA ***"
    "     NOTE: External FIFO or Buffer should be loaded with Data"
    "Pattern "
10  "----------------------------------------------------------------"
    test5: sel_r2 + sel_cntl + diag_bl, if (not fail) then load pl
                                            (15);

off,                         continue;

dackdn:s_strb,              if (bl_dack) then goto pl (dackdn);

15  dackup:off,                 if (not bl_dack) then goto pl (dackup);

off,                 while (creg <> 0) loop to pl (dackdn);

sel_stat + t_end_of_tst5 + int29k,  if (not fail) then goto
                                               pl (start);

"----------------------------------------------------------------"
20  "***  Test 6:  Transfer Data between External FIFO & Buffer with"
    "DMA ***"
    "     NOTE: External FIFO or Buffer should be loaded with Data"
    "Pattern "
    "----------------------------------------------------------------"
25  test6: sel_r2 + sel_cntl + diag_bl, if (not fail) then load pl
                                            (63);

off,                         continue;

dackd: s_strb,              if (bl_dack) then goto pl (dackd);

dacku: off,                 if (not bl_dack) then goto pl (dacku);
```

```
        off,            while (creg <> 0) loop to pl (dackd);
     sel_stat + t_end_of_tst6 + int29k,  if (not fail) then goto
                                             pl (start);

"************************************************************"
 5 "         Sequencer Resets to this location
   "
   "************************************************************"
          .org 511#d
        porst: init_regs + init_data, if (not fail) then goto pl (start);

10      end.
```

What is claimed is:

1. A system for transferring digital information including message, status, or command information between an external bus and a device that includes a microprocessor for controlling the transfers of the digital information, the external bus including a first byte-wide group of data lines and a plurality of additional byte-wide groups of data lines which carry the digital information, the external bus further including control signal lines which carry control signals that define operating phases of the external bus in accordance with a Small Computer System Interface (SCSI) communication protocol, the system comprising:

a main communication and bus control circuit coupled to the control signal lines and to the first byte-wide group of the data lines, the main communication and bus control circuit including integrated circuitry for generating and receiving the control signals on the control signal lines and for transferring a first byte of the digital information between the first byte-wide group of data lines and the device;

a plurality of modular interface extension circuits each coupled to a common one of the control signal lines and each coupled to a dedicated one of the additional byte-wide groups of data lines, each modular interface extension circuit including circuitry for transferring an additional byte of the digital information between its respective byte-wide group of data lines and the device, the transfers of the first and the additional bytes of the digital information being synchronized by a signal from the external bus on the common control signal line;

circuitry for transferring the first byte of the digital information between the main communication and bus control circuit and the device;

circuitry for transferring the additional bytes of the digital information between the plurality of modular interface extension circuits and the device; and a sequential logic circuit for controlling, in accordance with instructions from the microprocessor, parallel transfer of the first and the additional bytes of the digital information between the external bus and the device when the sequential logic circuit receives a signal from the microprocessor indicating that the digital information is message, status, or command information.

2. The system of claim 1, wherein the main communication and bus control circuit comprises a bi-directional SCSI bus interface integrated circuit that generates and receives the control signals including the signal on the common control signal line which synchronizes the transfers of the first and the additional bytes of the digital information.

3. The system of claim 2, wherein the bi-directional SCSI bus interface integrated circuit comprises a first-in, first-out storage circuit which provides the circuitry for transferring the first byte of the digital information.

4. The system of claim 1, wherein each of the plurality of modular interface extension circuits comprises a bi-directional, first-in, first-out storage circuit.

5. A mass data storage system for interfacing with a microprocessor, comprising:

a mass storage device set;

array controller means, coupled to the mass storage device set, for controlling transfers of mass storage data to and from the mass storage device set;

device controller means for initiating transfers of digital information including message, status, or command information between the device controller means and the array controller means;

a multi-conductor mass storage data communication bus for transferring the digital information between the array controller means and the device controller means, the communication bus having a first byte-wide group of data lines and a plurality of additional byte-wide group of data lines which carry the digital information, and control signal lines which carry control signals that define operating phases of the communication bus in accordance with a Small Computer System Interface-2 (SCSI-2) communication protocol; and interface means, associated with the array controller means and associated with the device controller means, for connecting the array controller means and the device controller means to the communication bus, the interface means comprising:

a main communication and bus control circuit coupled to the control signal lines and to the first byte-wide group of the data lines, the main communication and bus control circuit including integrated circuitry for generating and receiving the control signals on the control signal lines and for transferring a first byte of the digital information between the first byte-wide group of data lines and the interface means;

a plurality of modular interface extension circuits each coupled to a common one of the control signal lines and each coupled to a dedicated one of the additional byte-wide groups of data lines, each modular interface extension circuit including circuitry for transferring an additional byte of the digital information between its respective byte-wide group of data lines and the interface means, the transfers of the first and additional bytes of the digital information being synchronized by a signal from the external bus on the common control signal line; and sequential logic means for controlling parallel transfer of the first and the additional bytes of the digital information between the external bus and the interface means when the sequential logic means receives a signal from the microprocessor indicating that the digital information is message, status, or command information.

6. The mass data storage system of claim 5, wherein the main communication and bus control circuit comprises a bi-directional SCSI bus interface integrated circuit that generates and receives the control signals including the signal on the common control signal line which synchronizes the transfers of the first and the additional bytes of the digital information.

7. The mass data storage system of claim 6, wherein the bi-directional SCSI bus interface integrated circuit comprises a first-in, first-out storage circuit which provides the circuitry for transferring the first byte of the digital information.

8. The mass data storage system of claim 5, wherein each of the plurality of modular interface extension circuits comprises a bi-directional, first-in, first-out storage circuit.

9. A system for transferring digital information including message, status, or command information between an external bus and a device that includes a microprocessor for controlling the transfers of the digital information, the external bus including a first byte-wide group of data lines and a plurality of additional byte-wide groups of data lines which carry the digital information, the external bus further including control signal lines which carry control signals that define operating phases of the external bus, the system comprising:

- a main communication and bus control circuit coupled to the control signal lines and to the first byte-wide group of the data lines, the main communication and bus control circuit including integrated circuitry for generating and receiving control signals on the control signal lines and for transferring a first byte of the digital information between the first byte-wide group of data lines and the device;
- a plurality of modular interface extension circuits each coupled to a common one of the control signal lines and each coupled to a dedicated one of the additional byte-wide groups of data lines, each modular interface extension circuit including circuitry for transferring an additional byte of the digital information between its respective byte-wide group of data lines and the device, the transfers of the first and the additional bytes of the digital information being synchronized by a signal from the external bus on the common control signal line;
- circuitry for transferring the first byte of the digital information between the main communication and bus control circuit and the device;
- circuitry for transferring the additional bytes of the digital information between the plurality of modular interface extension circuits and the device; and
- a sequential logic circuit for controlling, in accordance with instructions from the microprocessor, parallel transfer of the first and the additional bytes of the digital information between the external bus and the device when the sequential logic circuit receives a signal from the microprocessor indicating that the digital information is message, status, or command information.

10. The system of claim 9, wherein the main communication and bus control circuit comprises a bi-directional bus interface integrated circuit that generates and receives the control signals including the signal on the common control signal line which synchronizes the transfers of the first and the additional bytes of the digital information.

11. The system of claim 10, wherein the bi-directional bus interface integrated circuit comprises a first-in, first-out storage circuit which provides the circuitry for transferring the first byte of the digital information.

12. The system of claim 9, wherein each of the plurality of modular interface extension circuits comprises a bi-directional, first-in, first-out storage circuit.

13. A mass data storage system for interfacing with a microprocessor, comprising:

- a mass storage device set;
- array controller means, coupled to the mass storage device set, for controlling transfers of mass storage data to and from the mass storage device set;
- device controller means for initiating transfers of digital information including message, status, or command information between the device controller means and the array controller means;
- a multi-conductor mass storage data communication bus for transferring the digital information between the array controller means and the device controller means, the communication bus having a first byte-wide group of data lines and a plurality of additional byte-wide group of data lines which carry the digital information, and control signal lines which carry control signals that define operating phases of the communication bus; and
- interface means, associated with the array controller means and associated with the device controller means, for connecting the array controller means and the device controller means to the communication bus, the interface means comprising:
  - a main communication and bus control circuit coupled to the control signal lines and to the first byte-wide group of the data lines, the main communication and bus control circuit including integrated circuitry for generating and receiving the control signals on the control signal lines and for transferring a first byte of the digital information between the first byte-wide group of data lines and the interface means;
  - a plurality of modular interface extension circuits each coupled to a common one of the control signal lines and each coupled to a dedicated one of the additional byte-wide groups of data lines, each modular interface extension circuit including circuitry for transferring an additional byte of the digital information between its respective byte-wide group of data lines and the interface means, the transfers of the first and the additional bytes of the digital information being synchronized by a signal from the external bus on the common control signal line; and
  - sequential logic means for controlling parallel transfer of the first and the additional bytes of the digital information between the external bus and the interface means when the sequential logic means receives a signal from the microprocessor indicating that the digital information is message, status, or command information.

14. The mass data storage system of claim 13, wherein the main communication and bus control circuit comprises a bi-directional bus interface integrated circuit that generates and receives the control signals including the signal on the common control signal line which synchronizes the transfers of the first and the additional bytes of the digital information.

15. The mass data storage system of claim 14, wherein the bi-directional bus interface integrated circuit comprises a first-in, first-out storage circuit which provides the circuitry for transferring the first byte of the digital information.

16. The mass data storage system of claim 13, wherein each of the plurality of modular interface extension circuits comprises a bi-directional, first-in, first-out storage circuit.

17. A system for transferring digital information including message, status, or command information between an external bus and a device that includes a microprocessor for controlling the transfers of the digital information, the external bus including a first byte-wide group of data lines and a plurality of additional byte-wide groups of data lines which carry the digital information, the external bus further including control signal lines which carry control signals that define operating states of the external bus, the system comprising:

- a main communication and bus control circuit coupled to the control signal lines and to the first byte-wide group of the data lines, the main communication and bus control circuit including integrated circuitry for generating and receiving control signals on the control signal lines and for transferring a first byte of the digital information between the first byte-wide group of data lines and the device;
- a plurality of modular interface extension circuits each coupled to a common one of the control signal lines and each coupled to a dedicated one of the additional byte-wide groups of data lines, each modular interface extension circuit including circuitry for transferring an additional byte of the digital information between its respective byte-wide group of data lines and the device, the transfers of the first and the additional bytes of the digital information being synchronized by a signal from the external bus on the common control signal line;

circuitry for transferring the first byte of the digital information between the main communication and bus control circuit and the device;

circuitry for transferring the additional bytes of the digital information between the plurality of modular interface extension circuits and the device; and a sequential logic circuit for controlling, in accordance with instructions from the microprocessor, parallel transfer of the first and the additional bytes of the digital information between the external bus and the device when the sequential logic circuit receives a signal from the microprocessor indicating that the digital information is message, status, or command information.

18. The system of claim 17, wherein the main communication and bus control circuit comprises a bi-directional bus interface integrated circuit that generates and receives the control signals including the signal on the common control signal line which synchronizes the transfers of the first and the additional bytes of the digital information.

19. The system of claim 18, wherein the bi-directional bus interface integrated circuit comprises a first-in, first-out storage circuit which provides the circuitry for transferring the first byte of the digital information.

20. The system of claim 17, wherein each of the plurality of modular interface extension circuits comprises a bi-directional, first-in, first-out storage circuit.

21. A mass data storage system for interfacing with a microprocessor, comprising:

a mass storage device set;

array controller means, coupled to the mass storage device set, for controlling transfers of mass storage data to and from the mass storage device set;

device controller means for initiating transfers of digital information including message, status, or command information between the device controller means and the array controller means;

a multi-conductor mass storage data communication bus for transferring the digital information between the array controller means and the device controller means, the communication bus having a first byte-wide group of data lines and a plurality of additional byte-wide group of data lines which carry the digital information, and control signal lines which carry control signals that define operating states of the communication bus; and interface means, associated with the array controller means and associated with the device controller means, for connecting the array controller means and the device controller means to the communication bus, the interface means comprising:

a main communication and bus control circuit coupled to the control signal lines and to the first byte-wide group of the data lines, the main communication and bus control circuit including integrated circuitry for generating and receiving the control signals on the control signal lines and for transferring a first byte of the digital information between the first byte-wide group of data lines and the interface means;

a plurality of modular interface extension circuits each coupled to a common one of the control signal lines and each coupled to a dedicated one of the additional byte-wide groups of data lines, each modular interface extension circuit including circuitry for transferring an additional byte of the digital information between its respective byte-wide group of data lines and the interface means, the transfers of the first and the additional bytes of the digital information being synchronized by a signal from the external bus on the common control signal line; and sequential logic means for controlling parallel transfer of the first and the additional bytes of the digital information between the external bus and the interface means when the sequential logic means receives a signal from the microprocessor indicating that the digital information is message, status, or command information.

22. The mass data storage system of claim 21, wherein the main communication and bus control circuit comprises a bi-directional bus interface integrated circuit that generates and receives the control signals including the signal on the common control signal line which synchronizes the transfers of the first and the additional bytes of the digital information.

23. The mass data storage system of claim 22, wherein the bi-directional bus interface integrated circuit comprises a first-in, first-out storage circuit which provides the circuitry for transferring the first byte of the digital information.

24. The mass data storage system of claim 21, wherein each of the plurality of modular interface extension circuits comprises a bi-directional, first-in, first-out storage circuit.

* * * * *